United States Patent
Craig et al.

(10) Patent No.: US 7,031,314 B2
(45) Date of Patent: *Apr. 18, 2006

(54) SYSTEMS AND METHODS FOR PROVIDING DIFFERENTIATED SERVICES WITHIN A NETWORK COMMUNICATION SYSTEM

(75) Inventors: David Craig, San Jose, CA (US); Constantine Polychronopoulos, Mountain View, CA (US); Sung-wook Han, San Jose, CA (US)

(73) Assignee: Bytemobile, Inc., Mountain View, CA (US)

( * ) Notice: Subject to any disclaimer, the term of this patent is extended or adjusted under 35 U.S.C. 154(b) by 625 days.

This patent is subject to a terminal disclaimer.

(21) Appl. No.: 10/126,131

(22) Filed: Apr. 19, 2002

(65) Prior Publication Data

US 2003/0053448 A1    Mar. 20, 2003

Related U.S. Application Data

(60) Provisional application No. 60/309,213, filed on Jul. 31, 2001, provisional application No. 60/291,918, filed on May 16, 2001.

(51) Int. Cl.
*H04L 12/28* (2006.01)
(52) U.S. Cl. ...................................... 370/392; 709/203
(58) Field of Classification Search .................. None
See application file for complete search history.

(56) References Cited

U.S. PATENT DOCUMENTS

| | | | |
|---|---|---|---|
| 5,414,704 A | 5/1995 | Spinney | 370/60 |
| 5,673,322 A | 9/1997 | Pepe et al. | 380/49 |
| 5,754,774 A | 5/1998 | Bittinger et al. | 395/200.33 |
| 5,991,795 A | 11/1999 | Howard et al. | 709/201 |
| 6,006,264 A | 12/1999 | Colby et al. | 709/226 |
| 6,034,958 A | 3/2000 | Wicklund | 370/395 |
| 6,157,955 A | 12/2000 | Narad et al. | 709/228 |
| 6,167,450 A | 12/2000 | Angwin et al. | 709/227 |
| 6,570,851 B1* | 5/2003 | Koskelainen et al. | 370/231 |
| 2002/0049841 A1* | 4/2002 | Johnson et al. | 709/225 |
| 2003/0018766 A1* | 1/2003 | Duvvuru | 709/223 |
| 2003/0028606 A1* | 2/2003 | Koopmans et al. | 709/206 |
| 2003/0048751 A1* | 3/2003 | Han et al. | 370/231 |

FOREIGN PATENT DOCUMENTS

WO    WO 99/13620    9/1998

* cited by examiner

*Primary Examiner*—Duc Ho
(74) *Attorney, Agent, or Firm*—Wilson Sonsini Goodrich & Rosari

(57) ABSTRACT

A service module incorporated within the network infrastructure intercepts packets communicated between a client and a server to determine whether the connection corresponds to one of a plurality of service applications that may supported by the service module. If so, the service module breaks the connection by terminating the connection with the client at the service module and opening a separate connection between the service module and the server. The service application may then perform application-specific process of the data communicated between the client and server. In order to increase processing efficiency associated with classifying the connection between the client and the server, the service module stores classification rules in a plurality of hashing tables, with hash conflicts arranged as an m-ary tree structure. This arrangement enables the service module to efficiently search for classification rules and resolve hash conflicts without imposing a significant processing penalty.

27 Claims, 11 Drawing Sheets

SYSTEMS AND METHODS FOR PROVIDING DIFFERENTIATED SERVICES WITHIN A NETWORK COMMUNICATION SYSTEM

REFERENCE TO RELATED APPLICATION

The present application claims priority from U.S. provisional application Ser. Nos. 60/291,918 filed May 16, 2001 and 60/309,213 filed Jul. 31, 2001. U.S. provisional application Ser. Nos. 60/291,918 and 60/309,213 are hereby incorporated herein by reference in its entirety.

BACKGROUND

1. Field of Invention

The present invention generally relates to network communication systems, and more particularly, to systems and methods for providing differentiated services within a network communication system.

2. Description of Related Art

Modern network communications systems have increasingly employed Internet-based architectures within the network infrastructure. These Internet-based architectures have provided network operators and subscribers significant advantages in terms of connectivity by enabling applications deployed on different physical networks to communicate with one another using a common communications protocol, such as TCP/IP. The recent increase in number and diversity of applications, subscribers and networking environments supported by these architectures, however, has exposed many of the limitations associated with a single, ubiquitous design. Because the Internet was initially intended to provide a free network in which stationary hosts predominately send unicast, reliable, sequenced, non real-time data streams, Internet-based architectures were designed to be robust and minimalistic, with much of the functionality provided by the end hosts. Consequently, the different and potentially incompatible requirements of the increasingly diverse applications, subscribers and networking environments has placed demands on the existing network infrastructure for which the network infrastructure was not originally designed to handle.

These problems have become increasingly apparent as network operators attempt to deploy differentiated services that tailor value-added data processing or performance optimization to particular applications and individual or enterprise subscribers. The problem with deploying these differentiated services within the existing network infrastructure is that the network infrastructure was not designed to support a wide variety application-specific and subscriber-specific services as the corresponding data flows through the network. For example, the routers, gateways and other network nodes typically employed within the network infrastructure generally provide passive routing functionalities. As a result, the existing network infrastructure generally lacks the capability to selectively perform application-specific manipulation of data streams corresponding to different applications and different subscribers.

The deployment of differentiated services within the network infrastructure faces additional challenges in that identifying the data streams on which to perform the differentiated services may involve a significant processing penalty. Some existing approaches attempt to avoid these problems by requiring the client application to send service requests associated with a particular application to a proxy server, which then acts as an agent on behalf of the client application. This approach, however, inhibits wide-scale deployment of differentiated services by requiring the client application to explicitly address service requests to the proxy server. Furthermore, because the proxy server typically uses its own source address and source port when communicating with the intended destination, this approach may cause the service request to fail in the event the intended destination does not recognize the source address and source port associated with the proxy server (which may occur if the intended destination is located behind a firewall). Accordingly, a conventional proxy server approach may be inappropriate to provide differentiated services due to the lack of a transparent end-to-end connection.

Therefore, in light of deficiencies of existing approaches, there is a need for improved systems and methods for providing differentiated services within a network communication system.

SUMMARY OF THE INVENTION

Embodiments of the present invention provide systems and methods for providing differentiated services within a network communications system. In one embodiment of the present invention, a service module incorporated within the network infrastructure maintains a plurality of service applications that provide application-specific manipulation of data streams, such email compression, web acceleration, or optimization of file transfers. The service module may then be configured to intercept packets communicated between a client and a server and selectively redirect the packets to one or more of the plurality of service applications in response to the packet header information matching a predetermined criteria. This predetermined criteria may comprise a set of classification rules that mask one or more fields of the packet header, such as the source address, destination address, source port, destination port, protocol field and device ID, to determine whether a single field or combination of fields match a predetermine value or range of predetermined values specified by the classification rule. If a connection between the client and the server matches a classification rule, the service module breaks the connection between the client and the server by terminating the connection with the client at the service module and opening a separate connection between the service module and the server. This process breaks the end-to-end connection between the client and the server to form two separate connections: a client-side connection between the client and the service module and a server-side connection between the service module and the server.

Once the client-side connection and the sever-side connection have been established, the service module may be configured to intercept subsequent packets addressed between the client and the server and redirect the packets via the client-side connection and the server-side connection to the service application associated with the classification rule. For example, the service module may be configured to modify the packet headers of incoming packets to replace the original destination address and destination port with a destination address and destination port associated with the service application. Packets addressed from the client may then be redirected to the service application by modifying the destination address and destination port associated with the server, and packets addressed from the server may be similarly redirected to the service application by modifying the destination address and destination port associated with the client. In an alternative embodiment, the service module may be configured to generate connection control parameters, such as TCP control block parameters, for the client-side connection and the server-side connection in response to the service module determining that the connection between the client and the server corresponds to the service application. These connection control parameters store the original source and destination information associated with the end-to-end connection (along with a redirected destination address and destination port associated with the service application) and enable the operating system and networking stack of the service module to recognize packets corresponding the end-to-end connection and redirect the packets to the service application.

Because the packets communicated between the client and the server may be redirected to the service application via client-side connection and the server-side connection, the service application may examine data communicated between the client and the server and perform application-specific processing of the corresponding data stream. For example, the service application may be configured to forward messages corresponding to connection establishment, user authentication or other application-specific commands to the originally intended destination by reading the message from the client-side connection and writing the message to the server-side connection or vice versa in order to maintain end-to-end semantics for the connection. On the other hand, if the connection enters a transaction state, such as a transmission of an email message or web page content, the service application may be configured to buffer the data until all the data associated with the transaction has been received. Because the data is received via a separate connection between the service module and the source, the service module sends acknowledgement packets back to the source in response to each received packet so that the source will continue to send data associated with the transaction. Once the data corresponding to the transaction has been received, the service application may then process the data (e.g., by compressing the data) and reinsert the processed data into the data stream for transmission to the originally intended destination.

In order to ensure that outgoing packets are properly recognized and processed by the original source and the original destination, the service module may be configured to generate outgoing packets using the network addresses and ports associated with the end-to-end connection. For example, the service module may be configured to maintain a table (or linked list structure) that stores the original packet header information associated the client-side connection and the server-side connection. For outgoing packets sent through the client-side connection, the service module searches the table based on the information included in the packet header of the outgoing packet to determine the original packet header information associated with the client-side connection. The service module then modifies the outgoing packet to replace the source address and source port with the original network address and port associated with the server. Similarly, for outgoing packets sent through the server-side connection, the service module searches the table based on the information included in the packet header of the outgoing packet to determine the original packet header information associated with the server-side connection. The service module then modifies the outgoing packet to replace the source address and source port with the original network address and port associated with the client.

In an alternative embodiment, the service module may be configured to generate connection control parameters, such as TCP control block parameters, for the client-side connection and the server-side connection that incorporate the original network address and port associated with the end-to-end connection. The connection control parameters may then be used by the operating system and networking stack of the service module to generate outgoing packets having a network address and port corresponding to the original end-to-end connection between the client and the server. For example, the connection control parameters for the client-side connection may be configured to store the original source and destination addresses and the original source and destination ports associated with the client and server. When data is communicated to the client via the client-side connection, the service module uses the connection control parameters to generate outgoing packets having a source address and source port associated with the server. The connection control parameters associated with the server-side connection may be similarly configured such that the operating system and networking stack of the service module automatically generates outgoing packets addressed to the server using the original source address and source port associated with the client. Because packets transmitted from the service module include the original source and destination addresses and the original source and destination ports associated with the end-to-end connection, the client and the server treat received packets as though the packets originated from one another. As a result, the differentiated services may be applied by the service module in a manner transparent to the client and server.

In another embodiment of the present invention, the service module may be configured to maintain a set of classification rules that may be applied to the packet headers of incoming packets to determine whether the connection corresponds one or more of the service applications associated with the service module. These classification rules may be configured to be applied to packet header fields, such as the source address, destination address, source port, destination port, protocol field and device ID. Each classification rule may comprise a set of masks that may be applied to corresponding fields of the packet header to determine whether each field of the packet header matches a predetermined value or range of predetermined values specified by the classification rule. For example, the classification rules may be configured to mask all or a combination of packet header fields, such as the source address, destination port and protocol field, to determine whether the combination of packet header fields matches the classification rule. If so, the packets may be redirected to the service application associated with the classification rule by examining the redirected destination address and destination port associated with the classification rule. By classifying all or a combination of the packet header fields, the service module may be configured redirect incoming packets to a particular service application based on the identity of the subscriber, the type source process, the type destination process, the type of protocol or a combination of any of the foregoing, thereby enabling the service module to provide a flexible platform for providing multiple value-added services based an a variety of service criteria.

In order to provide efficient classification, other embodiments of the present invention may store portions of the classification rules in multiple hashing tables that correspond to a particular packet dimension or combination of packet dimensions. Each hashing table may then be associated with one or more hash fields corresponding to a portion of the packet header. For example, in one embodiment of the present invention, the classification rules may be stored in five hashing tables, one for the source address, one for the destination address, one for the source port and destination port, one for the protocol field, and one for the device ID field. The hash entries in the hashing tables may comprise either a rule or a set of pointers and keys arranged in a m-ary tree structure that may be used to resolve hash conflicts. The hash entries may also contain a flag that identifies the next hashing table to search in the event a packet header does not match a classification rule or in the event a pointer comprises a null pointer. For example, classification may initially be performed on one of the hashing tables, such as the hashing table associated with the source address, by hashing the table based on the packet dimension associated with the hashing table, such as the most significant bits of the source address. If the hash entry comprises a classification rule, the classification rule may be applied to the packet header to determine whether there is a match. If so, the connection may be redirected to the service application associated with the classification rule. If not, classification may be performed using the hashing table indicated by the flag associated with the classification rule. On the other hand, if the hash entry comprises a set of pointers and keys, a binary search may be performed using a hash sort field of the packet header and the foregoing process may be repeated using the hash entry indicated by the sorted pointer (e.g., the pointer to the right of the key that is greater than or equal to the hash sort field of the packet header). This aspect of the present invention exploits the fact that some packet header fields may have significant hash conflicts that may be resolved using the "right" hashing table (or packet dimension). By incorporating a flag within each hash entry that points to a hashing table and/or hash field where there may be fewer conflicts, classification may be performed with a significantly reduced performance penalty.

Still further embodiments of the present invention provide efficient memory management of the hashing tables by utilizing a flag to indicate whether a particular entry in the hashing table is "occupied" by a classification rule (or set of pointers and keys) or corresponds to unused or "default" hash entry. Using this approach, unused hash entries may be used to store classification rules associated with the leaf nodes of the m-ary tree or additional sets of pointers and keys. If a packet header hashes to one of the unused hash entries (that may be currently storing another classification rule), the occupied/default flag may be examined to determine whether to apply the hash entry. If the occupied/default flag is in a unused state, the service module may provide no services or direct the connection to an agreed to default service application. If the occupied/default flag is in an occupied state, on the other hand, the classification rule may be applied (or the set of pointers and keys may be searched). Incorporating the occupied/default flag within the hash entry enables the service module to utilize unused cache lines, which may result in significant memory savings in the event of the hashing table includes a sparse set of classification rules.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Aspects of the present invention provide systems and methods for providing differentiated services within a communications network. The following description is presented to enable a person skilled in the art to make and use the invention. Descriptions of specific applications are provided only as examples. Various modifications, substitutions and variations of the preferred embodiment will be readily apparent to those skilled in the art, and the generic principles defined herein may be applied to other embodiments and applications without departing from the spirit and scope of the invention. Thus, the present invention is not intended to be limited to the described or illustrated embodiments, and should be accorded the widest scope consistent with the principles and features disclosed herein.

It should also be noted that embodiments of the present invention may provide certain advantages in the context of a wireless communication system in that particular service applications may be used to provide value-added services to wireless clients or performance optimization for transmission over a wireless channel. For example, embodiments of the present invention may incorporate service applications that may be used to compress content, such as email messages or web pages, communicated toward a wireless client in order to minimize download times and reduce the potential for random packet loss during transmission of the content over the wireless channel. It is understood that although embodiments of the present invention may be described in the context of a wireless communication system, the principles of the present invention are not limited to wireless networking environments. Rather, the principles of the present are equally applicable to other types of networking environments, such as the Internet and other wireline networks. Therefore, the described and illustrated embodiments are provided for the purposes of illustration and not limitation.

Figure 1A:
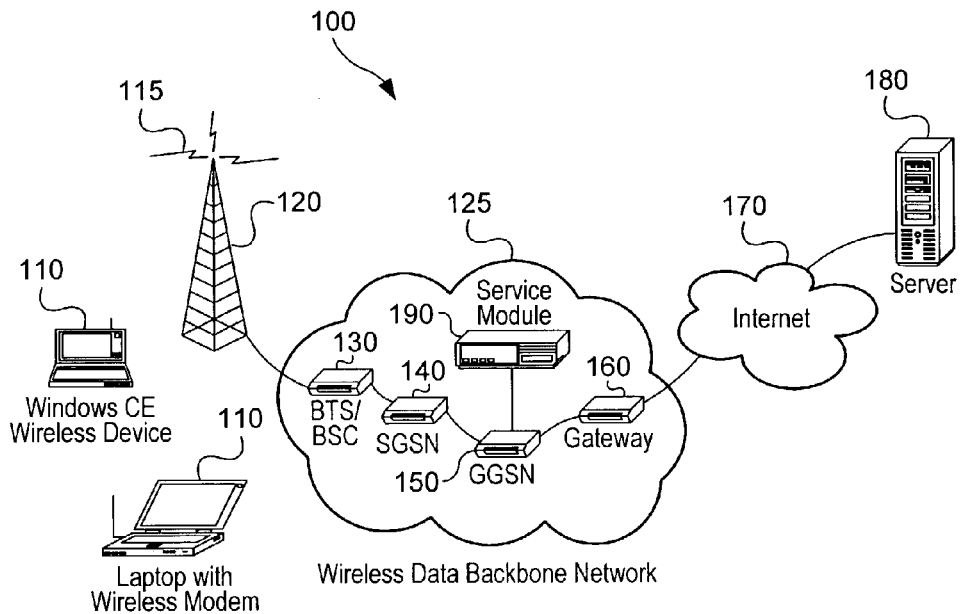
FIGS. 1A and 1B illustrate exemplary network communication systems in which the principles of the present invention may be advantageously practiced.

Referring to FIG. 1A, an exemplary network communication system in which the principles of the present invention may be advantageously practiced is depicted generally at 100. The exemplary system includes a wireless client 110, such as a personal digital assistant or laptop computer equipped with a wireless modem, that communicates with a server 180 via a wireless backbone network 125 and the Internet 170. In this exemplary system, the wireless backbone network 125 employs a General Packet Radio Service (GPRS) architecture. Accordingly, in order to communicate with the server 180 on the uplink, the wireless client 110 communicates with a base station 120 located within the wireless client's assigned cell. The base station 120 then forwards data and signaling information received from the wireless client 110 through the wireless backbone network 125 via a base transceiver station 130, a serving GPRS support node (SGSN) 140, a gateway GPRS support node (GGSN) 150 and a gateway 160. The gateway 160 acts as an interface between the wireless backbone network 125 and nodes within the Internet 170 and enables information to be transceived between wireless clients 110 coupled to the wireless backbone network 170 and servers 180 coupled to the Internet 170. On the downlink, information is routed through the Internet 170 and wireless backbone network 125 from the server 180 toward the wireless client 110. Once the information is received by the base station 120, the information is transmitted to the wireless client 110 over a wireless channel 115.

Figure 1B:
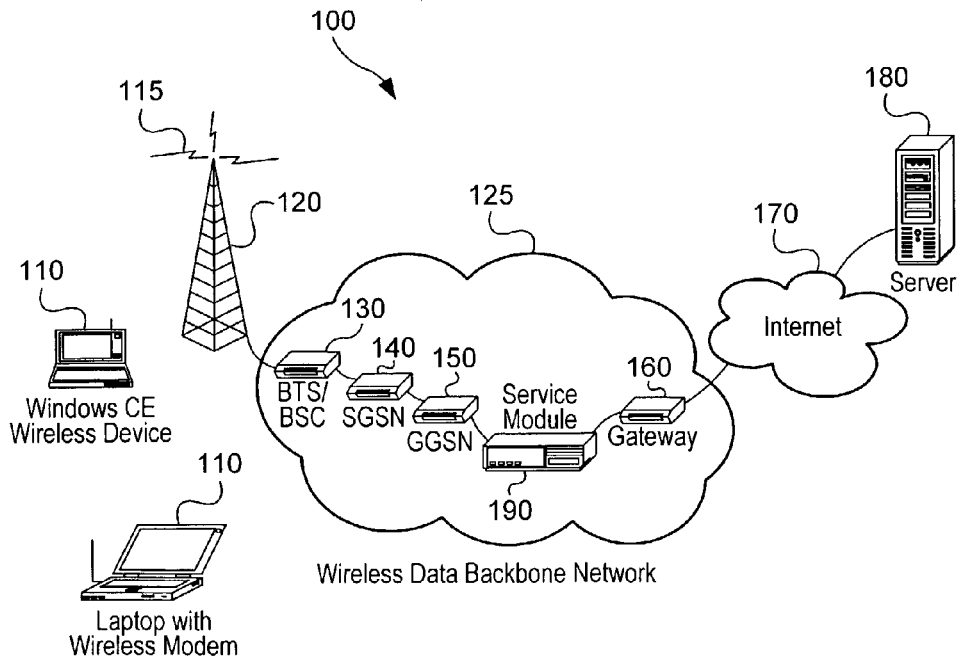

Aspects of the present invention may also incorporate a service module 190 within the network infrastructure between the wireless client 110 and server 180 in order to enable the service module 190 to provide differentiated services as the corresponding packets flow through the network. As illustrated in FIG. 1A, for example, the service module 190 may be deployed in an offload configuration that enables the service module 190 to process packets forwarded from a network node, such as a GGSN 150. The configuration of FIG. 1A may be advantageous in that it enables the service module 190 to conform to less stringent reliability requirements, and allows the service module 190 to be periodically taken off-line for hardware or software upgrades or periodic maintenance without disabling links between adjacent nodes. In an alternative embodiment illustrated in FIG. 1B, the service module 190 may be arranged in an inline configuration between network nodes such that packets are routed through the service module 190. This inline configuration may also be advantageous in that it may minimize packet processing delays by enabling the service module 190 to process packets without traversing through an intermediate network node. Other embodiments may directly incorporate functionalities of the service module 190 within a network node, such as a GGSN 150, SGSN 140, gateway 160, base transceiver station 130 or the like, in order to enhance the processing capabilities of conventional network nodes or reduce the overhead associated with maintaining separate pieces of equipment.

In operation, the service module 190 may be configured to maintain a plurality of service applications that provide application-specific manipulation of data streams, such email compression, web acceleration, or optimization of file transfers. The service module 190 may then be configured to provide differentiated services by intercepting packets communicated between the wireless client 110 and the server 180 and selectively redirecting the packets to one or more of the plurality of service applications in response to the packet header information matching a predetermined criteria. This predetermined criteria may comprise a set of classification rules that mask one or more fields of the packet header, such as the source address, destination address, source port, destination port, protocol field and device ID, to determine whether the combination of fields match a predetermine value or range of predetermined values specified by the classification rule. If a connection between the wireless client 110 and the server 180 matches a classification rule, the service module 190 breaks the connection between the wireless client 110 and the server 180 by terminating the connection with the wireless client 110 at the service module 190 and opening a separate connection between the service module 190 and the server 180. This process breaks the end-to-end connection between the wireless client 110 and the server 180 to form two separate connections: a client-side connection between the wireless client 110 and the service module 190 and a server-side connection between the service module 190 and the server 180. Packets corresponding to the end-to-end connection between the wireless client 110 and the server 180 may then be redirected through the client-side connection and the server-side connection to the service application associated with the classification rule to enable the service application to perform application-specific processing of the corresponding data.

For packets communicated on the uplink from the wireless client 110 to the server 180, the service module 190 may be configured in one embodiment to redirect the packets to the service application by replacing the original destination address and destination port associated with the server 180 with a destination address and destination port associated with the service application. This redirection process enables incoming packets to be treated by the operating system and networking stack of the service module 190 as though the packets were terminated at the email compression application. In an alternative embodiment, the service module 190 may be configured to generate connection control parameters, such as TCP control block parameters, for the client-side connection that stores the original source and destination information associated with the end-to-end connection (along with the redirected address and port associated with the service application) in response to the service module 190 detecting that the connection matches a classification rule. These connection control parameters may then be used by the operating system and networking stack of the service module 190 to recognize and redirect subsequent packets communicated between the wireless client 110 and the server 180 to the service application.

Once the incoming data is passed to the service application, the service application may then examine the data communicated from the wireless client 110 to the server 180, process the data, and forward the data to the server 180 by writing the data to the server-side connection. The data then flows through the operating system and networking stack of the service module 190 to generate an outgoing packet addressed to the server 190. Because the operating system and networking stack of the service module 190 may treat the packet as through the packet originated at the service application, the outgoing packet may have source address and source port fields associated with the service application. In order to ensure that outgoing packets are properly received and processed by the server 180 (which may be a problem in the event the server 180 is behind a firewall that limits access to particular source addresses or to source addresses within a particular range), the server module 190 may be configured in one embodiment to modify the packet header of outgoing packets to replace the source address and source port associated with the service application with the original source address and source port associated with the end-to-end connection. For example, the service module 190 may be configured to maintain a lookup table (or linked-list structure) that stores the original packet header information initially received from the wireless client 110 before the packet header information is modified during the redirection process. The service module 190 may then search the lookup table to determine the original source address and source port and modify the packet header of the outgoing packet to replace the source address and source port associated with the service application with the source address and source port associated with the wireless client 110. In an alternative embodiment, the service module 190 may be configured to maintain connection control parameters, such as TCP control block parameters, for the server-side connection that incorporate the original network address and port associated with the wireless client 110. The connection control parameters may then be used by the operating system and networking stack of the service module 190 to automatically generate outgoing packets addressed to the server 180 using the original source address and source port associated with the wireless client 110. Because the outgoing packets received by the server 180 have a source address and source port associated the wireless client 110, the server 180 does not and cannot know that the service module 190 has broken the end-to-end connection and (possibly) performed intermediate processing on the transmitted data. As a result, the server 180 treats the connection as though the connection was between the server 180 and the wireless client 110.

For packets communicated on the downlink from the server 180 to the wireless client 110, the service module 190 may similarly redirect the incoming packets through the server-side connection by either replacing the destination address and destination port associated with the wireless client 110 with the destination address and destination port associated the service application, or maintaining connection control parameters for the server-side connection that enables the operating system and networking stack of the service module 190 to recognize and redirect packets associated with the end-to-end connection to the service application. The service application may then examine the data communicated from the server 180 to the wireless client 110, process the data, and forward the data to the wireless client 110 via the client-side connection. For example, if the data received from the server 180 corresponds to connection establishment, user authentication or other application protocol-specific messages, the service application 190 forwards the messages to the wireless client 110 by writing the data to the client-side connection in order to maintain end-to-end semantics. On the other hand, if the service application detects a transaction state, such as transmission of an email message, the service module 190 may be configured to buffer the data corresponding to the transaction. Because these data packets are received on a separate server-side connection, the operating system and networking stack automatically sends "fake" acknowledgement packets back to the server 180 in response to each received packet so that the server 180 will continue to send data corresponding to the transaction. Once the all the data corresponding to the transaction is received, the service application may then process the data (e.g., by compression the data) and write the processed data to the client-side connection for transmission to the wireless client 110.

In order to maintain a transparent end-to-end connection, the service module 190 may also perform a reverse-redirection process on outgoing packets communicated to the wireless client 110 through the client-side connection. In other words, the service module 190 may be configured in one embodiment to perform a search of the lookup table to determine the original network address and port associated with the server 180. The service module 190 may then modify the packet headers of outgoing packets transmitted to the wireless client 110 to replace the source address and source port associated with the service application with the original network address and port associated with the server 180. In an alternative embodiment, the service module 190 may be configured to maintain connection control parameters for the client-side connection that stores the original source and destination information associated with the end-to-end connection and enables the operating system and networking stack of the service module 190 to generate outgoing packets communicated to the wireless client 110 using a source address and source port associated with the server 180. Because the outgoing packets received by the wireless client 110 include a source address and source port associated with the server 180, the wireless client 110 is similarly unaware that the service module 110 has broken the end-to-end connection in order to provide the differentiated service. As a result, the wireless client 110 also treats the connection as though the connection was between the wireless client 110 and the server 180.

By incorporating the service module 190 within the network between the wireless client 110 and server 180, differentiated services may be performed without requiring special processing by the server 180 (or hosts coupled to the network side of the server 180) before the data is transmitted to the wireless client 110 and without requiring the wireless client 110 to perform special connection establishment procedures with a proxy server. Furthermore, because outgoing packets may be configured to use the original network addresses and ports associated with the end-to-end connection, the differentiated services may also be performed in a manner transparent to the wireless client 110 and the server 180. As a result, these aspects of the present invention provide a flexible platform that enables network operators to provide a wide-variety of differentiated services to their individual and enterprise subscribers that tailor the particular services to the particular application and particular subscriber.

Figure 2:
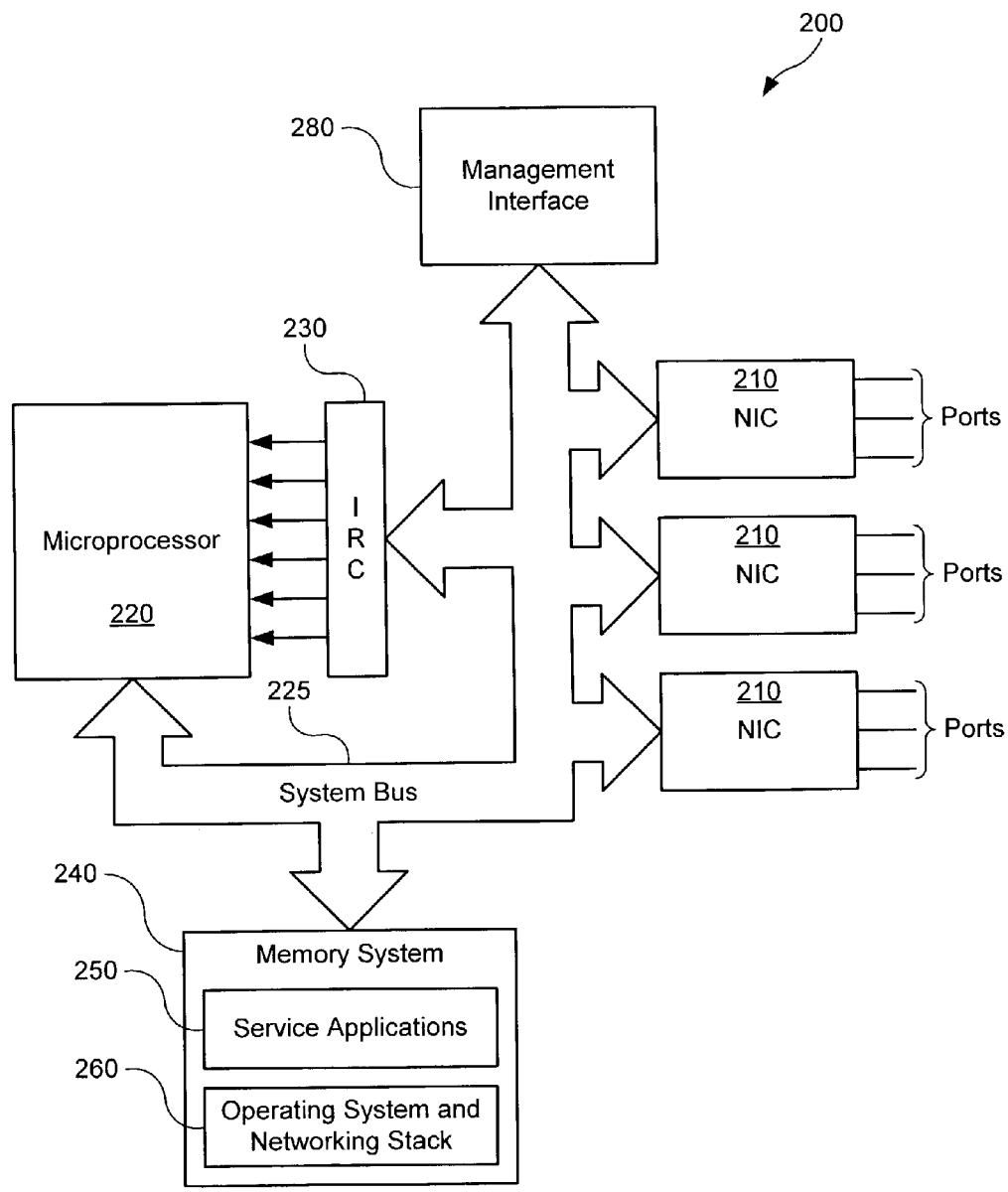
FIG. 2 illustrates an exemplary service module platform that may be used in accordance with the present invention.

Referring to FIG. 2, an exemplary service module platform that may be used in accordance with the present invention is depicted generally at 200. As illustrated, the exemplary platform includes one or more network interface cards 210 for interfacing with other nodes within the network, such as a base transceiver station, a SGSN, a GGSN, a gateway or the like. The network interface cards 210 are coupled to a processor 220 via a system bus 225. The processor 220 is also coupled to a memory system 240, such as a random access memory, a hard drive, a floppy disk, a compact disk, or other computer readable medium, which stores an operating system and networking stack 260 and one or more service applications 250. The exemplary platform may also include a management interface 280, such as a keyboard, input device or port for receiving configuration information, that may be used to selectively modify configuration parameters within the operating system and networking stack 250 and the service applications 250 without requiring the modules to be re-compiled.

In operation, the network interface cards 210 generate a system interrupt to the interrupt controller 230 in response to the network interface card 210 receiving a packet. The interrupt controller 230 then passes the interrupt to the processor 220 in accordance with the interrupt's assigned priority. Once the interrupt is received by the processor 220, the interrupt causes the processor 220 to execute interrupt handlers incorporated within the operating system and networking stack 260 to process the received packet. These modules may provide operating system functions and other functions associated with the applicable protocol, such as TCP/IP or UDP/IP. Embodiments of the present invention may also incorporate other functionalities within the operating system and networking stack 260, such as functionalities for classifying the connection, breaking the connection between the wireless client and the server, and generating source addresses for outgoing packets.

Figure 3A:
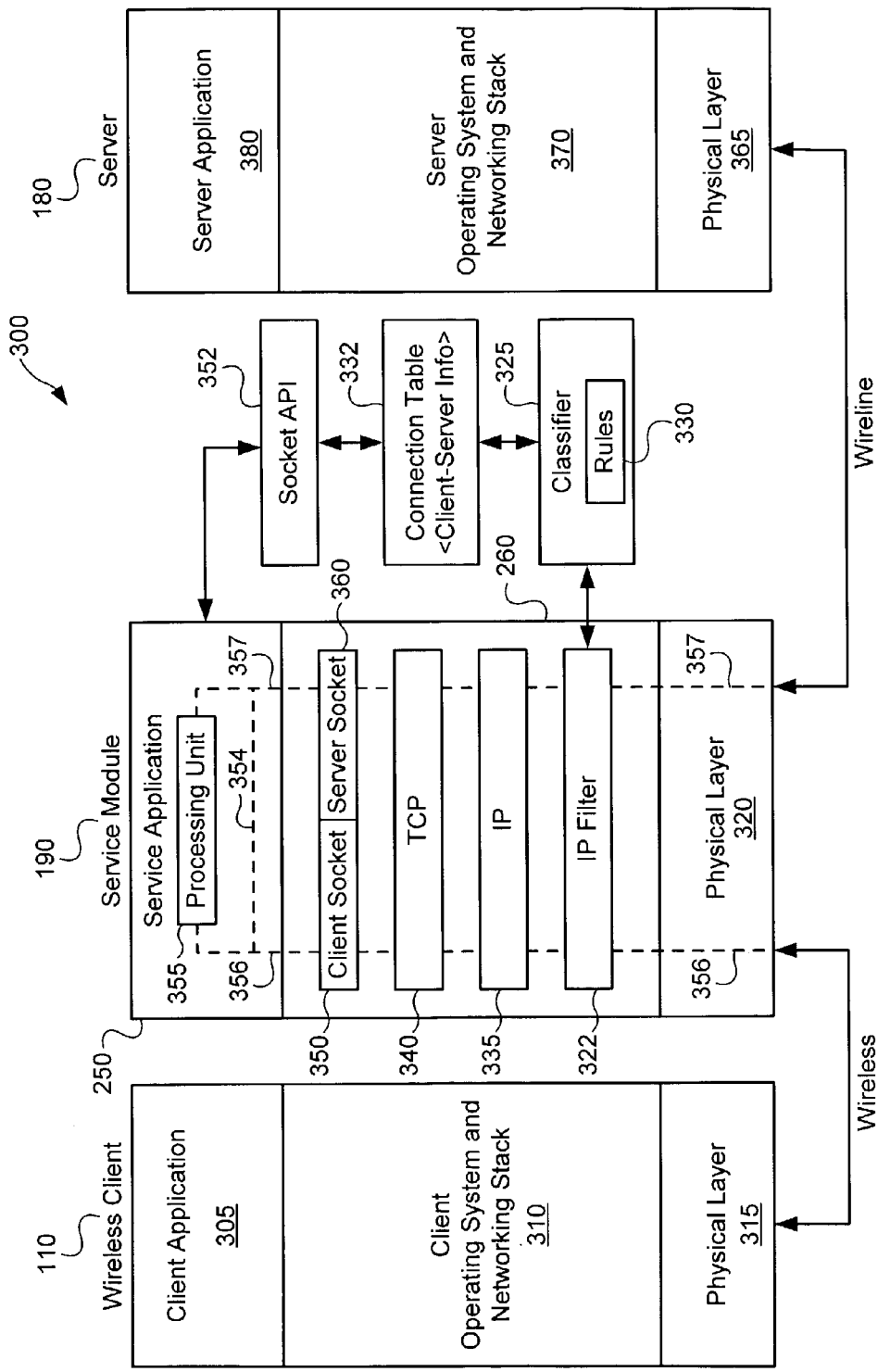
FIGS. 3A and 3B illustrate functional block diagrams of an exemplary system for providing differentiated services in accordance with a first and a second embodiment of the present invention.

Referring to FIG. 3A, a functional block diagram of an exemplary system in accordance with one embodiment of the present invention is illustrated generally at 300. The exemplary system includes a service module 190 having a physical layer 320, an operating system and networking stack 260 and a service application 250. As packets are received by the physical layer 320, the physical layer 320 initiates a interrupt to the operating system and networking stack 260 to process the received packet. An IP filter layer 322 within the operating system and networking stack 260 then initiates a classifier 325 to classify the received packet in accordance with a set of classification rules 330 to determine whether the packet corresponds to a service provided by the service application 250. These classification rules 330 may comprise one or more masks that are applied to the packet header, such as the source address, destination address, source port, destination port, protocol field and device ID. Each classification rule may comprise a set of masks that may be applied to corresponding fields of the packet header to determine whether each field of the packet header matches a predetermined value or range of predetermined values specified by the classification rule. For example, the classification rules may be configured to mask all or a combination of packet header fields, such as the source address, destination port and protocol field, to determine whether the combination of packet header fields matches the classification rule. An exemplary classification rule 330 for determining whether a received packet correspond to a email service may mask the source address, source port, destination address, and device ID fields within the packet header and determine whether the protocol field equals TCP and whether the destination port equals either 110 (for POP email protocol) or 143 (for IMAP email protocol).

If the packet does not match a classification rule 330, the classifier 325 either drops the packet, returns the packet to the IP filter layer 322 without modification, or redirects the packet to a default service application. If the packet matches a classification rule associated with the service application 250, however, the classifier 325 redirects the packet to the service application 250 associated with the classification rule by modifying the packet header to replace the original destination address and destination port with a destination address and destination port associated with the service application 250. The classifier 325 then returns the modified packet to the IP filter layer 322, which forwards the modified packet to the IP and TCP layers 335, 340 for processing. The classifier 325 also stores the original packet header information (along with the redirected destination address and destination port) within a connection table 332 to enable the classifier 325 and the service application 250 to access the original packet header information at a later time, as will be described hereinbelow.

Because the modified packet header includes a destination address and destination port associated with the service application 250, the IP and TCP layers 335, 340 process the modified packet as though the packet were terminated at the service application 250. As a result, the IP and TCP layers 335, 340 unpack the modified packet and pass the packet data to the operating system and networking stack 260. For packets corresponding to a new connection from a new source (typically the wireless client 110), the operating system and networking stack 260 forwards the packet data to a client socket 360 that the service application 250 previously established to receive new connections. The operating system and networking stack 250 also sets a flag to inform the service application 250 that a new connection has been requested. Once the service application 250 accepts the new connection, subsequent packets from the same source to the same destination are forwarded by the operating system and networking stack 260 to that client socket 350. In other words, as subsequent packets from the same source to the same destination flow through the classifier 335, the classifier 335 redirects the packets to the service application 250. The IP and TCP layers 335, 340 then process the redirected packets based on the source and modified destination information, and the operating system and networking stack 260 passes the data to the client socket 350. The service application 250 may then access data communicated from the source by performing a read operation on the client socket 350 and send data to the source by performing a write operation on the client socket 350.

In order to provide a connection to the original destination (typically the server 180), the service application 250 initiates a socket API 352 that searches the connection table 332 based on the source address and redirected destination address associated with the client socket 350. This search of the connection table 332 enables the service application 250 to recover the original packet header information before the destination information was modified by the classifier 325 during the redirection process. Once the service application 250 retrieves the original packet header information, the service application 250 may then open a server socket 360 using the original destination address and destination port. This process opens a separate connection between the service application 250 and the original destination to enable data to be communicated between the destination and the service application 250. The service application 250 also initiates another call to the socket API 352 to create a new entry within the connection table 332 that stores the original packet header information (that was retrieved by email compression application 250), along with the redirected destination address and destination port associated with the server socket 360. Once the server socket 360 is established, the service application 250 may then receive data from the destination by performing a read operation on the server socket 360 and send data to the destination by performing a write operation on the server socket 360.

For write operations performed on the client socket 350 and the server socket 360, the corresponding data flows through the TCP and IP layers 340, 335 as though the data originated from the service application 250. As a result, the TCP and IP layers 340, 335 may generate packets having a source address and source port associated with the service application 250. In order to ensure that the packets are properly recognized and processed by the original source and the original destination (which may be a problem in the event the source and/or destination are behind a firewall that limits access to particular source addresses or a particular range of source addresses), the IP filter layer 322 initiates a call to the classifier 325 to modify outgoing packets to replace the source address and source port with the original source address and source port associated with the end-to-end connection. For packets addressed from the client socket 350, for example, the classifier 325 searches the connection table 332 based on the information included in the packet header of the outgoing packet to determine the original packet header information associated with the client socket 350. The classifier 325 then modifies the outgoing packet to replace the source address and source port with the original network address and port associated with the destination and returns the modified packet to the IP filter layer 322 such that the outgoing packet to the source appears to originate from the destination. For outgoing packets addressed from the server socket 350, the classifier 325 similarly searches the connection table 332 for the original packet header information associated with the server socket 360 (that was stored by service application 250) and modifies the packet header of the outgoing packet by replacing the source address and source port fields with the original network address and port associated with the source such that the outgoing packet to the destination appears to originate from the source. Accordingly, because packets transmitted from the service module 190 include the original source and destination addresses and original source and destination ports, the original source and the original destination are unaware that the service module 190 intercepted the packets and (possibly) performed intermediate processing on the transmitted data.

Once the client socket 350 and server socket 360 have been established and the connection information associated with each socket has been stored in the connection table 332, the classifier 325 may then classify subsequent packets by searching the connection table 332 to determine whether the packets correspond to an on-going connection. If the packet header of an incoming packet matches an entry stored in the connection table 332, the classifier 325 may then access the redirected destination address and destination port stored in the connection table 332 and modify the destination address and destination port of the packet header as described above. If the incoming packet does not match an entry stored in the connection table 332, the classifier 325 may classify the packet in accordance with the classification rules 330 to determine whether to redirect the packet to the service application 250. By performing an initial search of the connection table 332, however, the classifier 325 may avoid the need to re-classify additional packets corresponding to an on-going connection (which may comprise the majority of packets forwarded to or through the service module 190).

During an exemplary communication session, packets addressed from a client application 305 to a server application 380 flow through the client operating system and networking stack 310 and physical layer 315 of the wireless client 110 and across the wireless portion of the communications network. The communications network then forwards the packets to or through the service module 190 depending on whether the service module 190 is arranged in an inline or offload configuration. Once the service module 190 receives the incoming packets from the client application 305, the IP filter layer 322 calls the classifier 325 to classify the received packets to determine whether the packets correspond to one or more service applications by either searching the connection table 332 or classifying the packets in accordance with the classification rules 330. If the packets correspond to the service application 250, the classifier 325 terminates the connection with the client application 305 at the service application 250 to form a client-side connection 356 between the service application 250 and the client application 305. The service application 250 may then receive data from the client application 305 by performing a read operation on the client-side connection 356 and send data to the client email application 305 by performing a write operation on the client-side connection 356.

Similarly, packets addressed from the server application 380 to the client application 305 flow through the server operating system and networking stack 370 and physical layer 365 of the server 180 and across the wireline portion of the communications network. Once the service module 190 receives the incoming packets from the server application 380, the IP filter layer 322 calls the classifier 325 to classify the received packets to determine whether the packets correspond to one or more service application by either searching the connection table 332 or applying the classification rules 330. If the packets correspond to an the service application 250, the classifier 325 redirects the packets to the service application 250 through a separate server-side connection 357 that the service application 250 opened in response to the initial packet received from the client application 305. The service application 250 may then receive data from the server application 380 by performing a read operation on the server-side connection 357 and send data to the server application 380 by performing a write operation on the server-side connection 357.

For outgoing packets sent by the service application 250 through the client-side connection 356, the IP filter layer 322 calls the classifier 325 to search the connection table 332 and replace the source address and source port associated with the service application 250 with the network address and port associated with the server application 380. The modified outgoing packets are then routed through the wireless portion of the communications network and are transmitted to the wireless client 110. Once the wireless client 110 receives the packets, the client operating system and networking stack 310 processes the packets as though the packets originated directly from the server application 380 and passes the processed packets to the client application 305. The classifier 325 similarly modifies outgoing packets sent by the service application 250 through the server-side connection 357 by replacing the source address and source port associated with the service application 250 with the network address and port assignment associated with the client application 305. The outgoing packets are then routed to the server 180 through the wireline portion of the communications network. Once the server 180 receives the packets, the server operating system and networking stack 370 processes the packets as though the packets originated directly from the client application 305 and passes the processed packets to the server application 380.

Because the client-side connection 356 and the server-side connection 357 either terminate or originate at the service application 250, the service application 250 may monitor data received from the client-side connection 356 and the server-side connection 357 and perform application-specific processing of the data. For example, the service application 250 may be configured to forward connection-related data, such as connection establishment and user authentication messages, between the client-side connection 356 and the server-side connection 357 by reading the data from the client-side connection 356 and writing the data to the server-side connection 357 and vice versa (as indicated generally by line 354) in order to maintain end-to-end semantics for the connection. Alternatively, if the service application 250 detects initiation of a transaction state, the service application 250 may buffer the corresponding data within a processing unit 355 until the data associated with the transaction has been received. Because these data packets are received through a separate connection, the TCP and IP layers 340, 355 automatically send acknowledgement messages back to the source of the data (typically the server 180) so that the source will continue to send data corresponding to the transaction. Once all the data is received, the processing unit 355 may then process the data in accordance with the particular service provided by the service application 250, such as compressing the data, reformatting the content, rearranging the order in which the content is transmitted, etc. The processed data may then be reinserted into the data stream by writing the compressed email message to the appropriate client-side connection 356 or server-side connection 357. By using the foregoing process, the service module 190 may be configured to intercept packets corresponding to particular applications and/or particular subscribers and provide one or more differentiated services in a manner transparent to the wireless client 110 and the server 180.

Figure 3B:
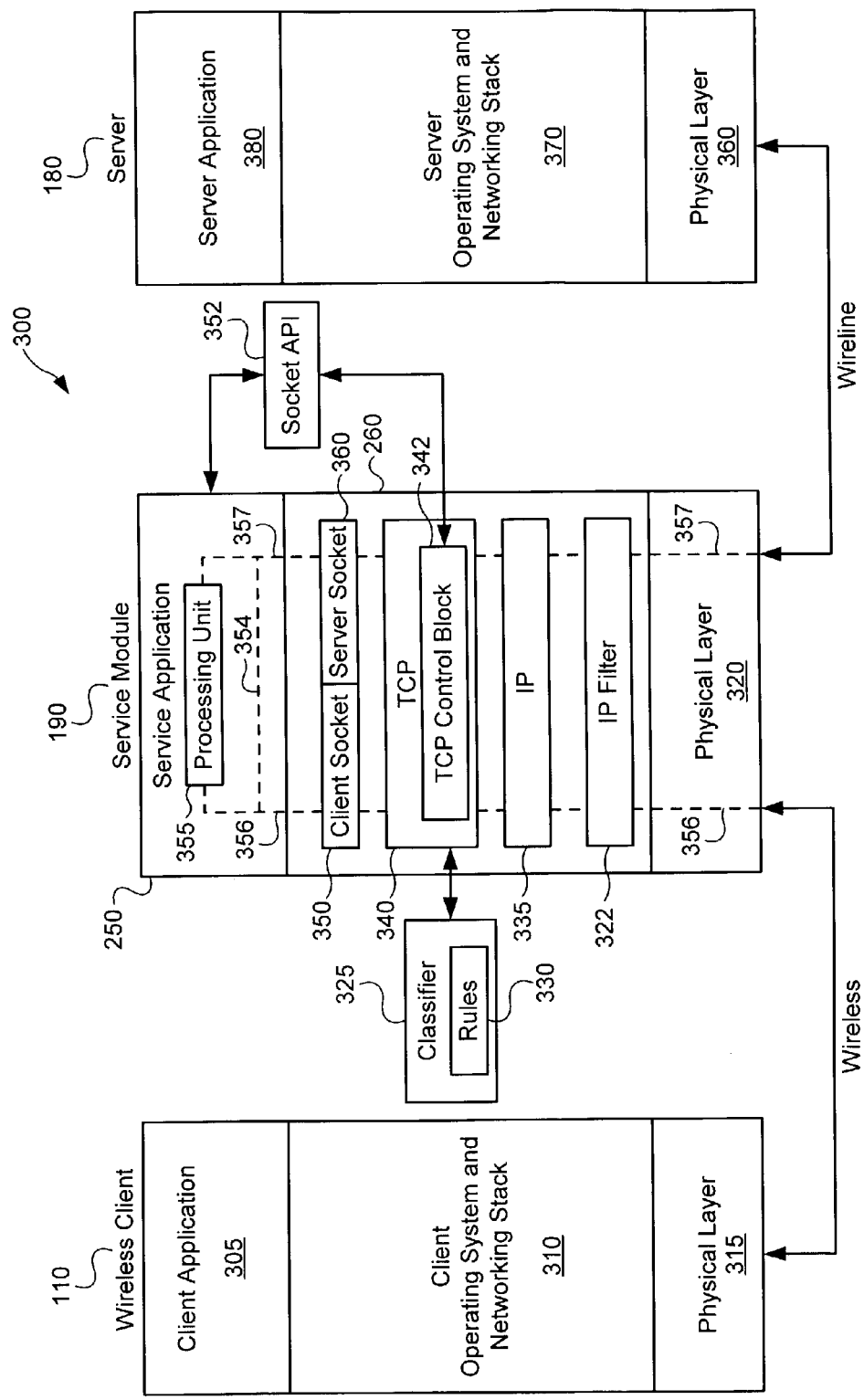

Referring to FIG. 3B, a functional block diagram of an exemplary system in accordance with a second embodiment of the present invention is illustrated generally at 300. The embodiment of FIG. 3B is substantially similar to the embodiment of FIG. 3A and incorporates many of the principles discussed above. The embodiment of FIG. 3B, however, utilizes a more efficient mechanism for classifying connections and redirecting incoming and outgoing data. For example, as the service module 190 receives packets communicated between the wireless client 110 and the server 180, the packets may be directed through the IP filter and IP layers 322, 335 to the TCP layer 340 of the service module 190. For packets corresponding to connection establishment packets, such as SYN packets used in TCP/IP based protocols, the TCP layer 340 calls the classifier 325 to classify the connection establishment packets in accordance with a set of classification rules 330. If the connection establishment packets match a classification rule 330, the classifier 325 instructs the TCP layer 340 to terminate the connection with the source at the service application 250 associated with the classification rule 330. The TCP layer 340 then modifies a TCP control block 342 to store the original packet header information received from the source, such as the original source and destination addresses and the original source and destination ports, and a redirected destination address and destination port associated with the service application 250. After the TCP layer 340 completes a three-way handshake with the original source, the operating system and networking stack 260 passes data to a client socket 360 and notifies the service application 250 that a new connection has been requested. Once the service application 250 accepts the new connection, the service application 250 calls a socket API 352 that accesses the TCP control block 342 associated with the client socket 350 to retrieve the original packet header information. The email compression application 250 then opens a server socket 360 using the original destination address and destination port, and calls the socket API 352 to store the original packet header information, along with the redirected address and redirected port associated with the server socket 360, within a TCP control block 342 associated with the server socket 360.

For subsequent incoming packets corresponding to the same connection, the TCP layer 340 uses the TCP control block 342 to redirect incoming packets addressed from the source to the client socket 350 and to redirect incoming packets addressed from the destination to server socket 360. The service application 250 may then examine data communicated between the source and destination by reading the client socket 350 and the server socket 360, and may send data to the source and destination by writing data to the appropriate client socket 350 and server socket 360. For data written to the client socket 350, the data is passed to the TCP layer 340, which accesses the TCP control block 342 associated with the client socket 350 and generates packets having a source address and source port associated with the original destination. For data written to server socket 360, the TCP layer 340 similarly accesses the TCP control block 342 associated with the server socket 360 and generates packets having a source address and source port associated with the original source. It will be appreciated that the embodiment of FIG. 3B offers advantages over the embodiment of FIG. 3A in that classification only needs to be performed on connection establishment packets, and the modification of the TCP control block 342 associated with the client socket 350 and the server socket 360 enables the TCP layer 340 to redirect incoming packets to the appropriate client socket 350 or server socket 360 and to automatically generate outgoing packets having a source address and source port associated with the original end-to-end connection. As a result, the email compression application 250 may monitor messages communicated between the wireless client 110 and the server 180 and transparently process the data as described above.

It should be noted that the foregoing description of the embodiments of FIGS. 3A and 3B is presented to enable a person of ordinary skill in the art to make and use the invention. Additional functions and features in the context of an email compression application are described in U.S. patent application Ser. No. 10/095,551, entitled "Service Based Compression of Content Within a Network Communication System", which has been assigned of record to the assignee of the present application and is incorporated herein by reference.

Figure 4:
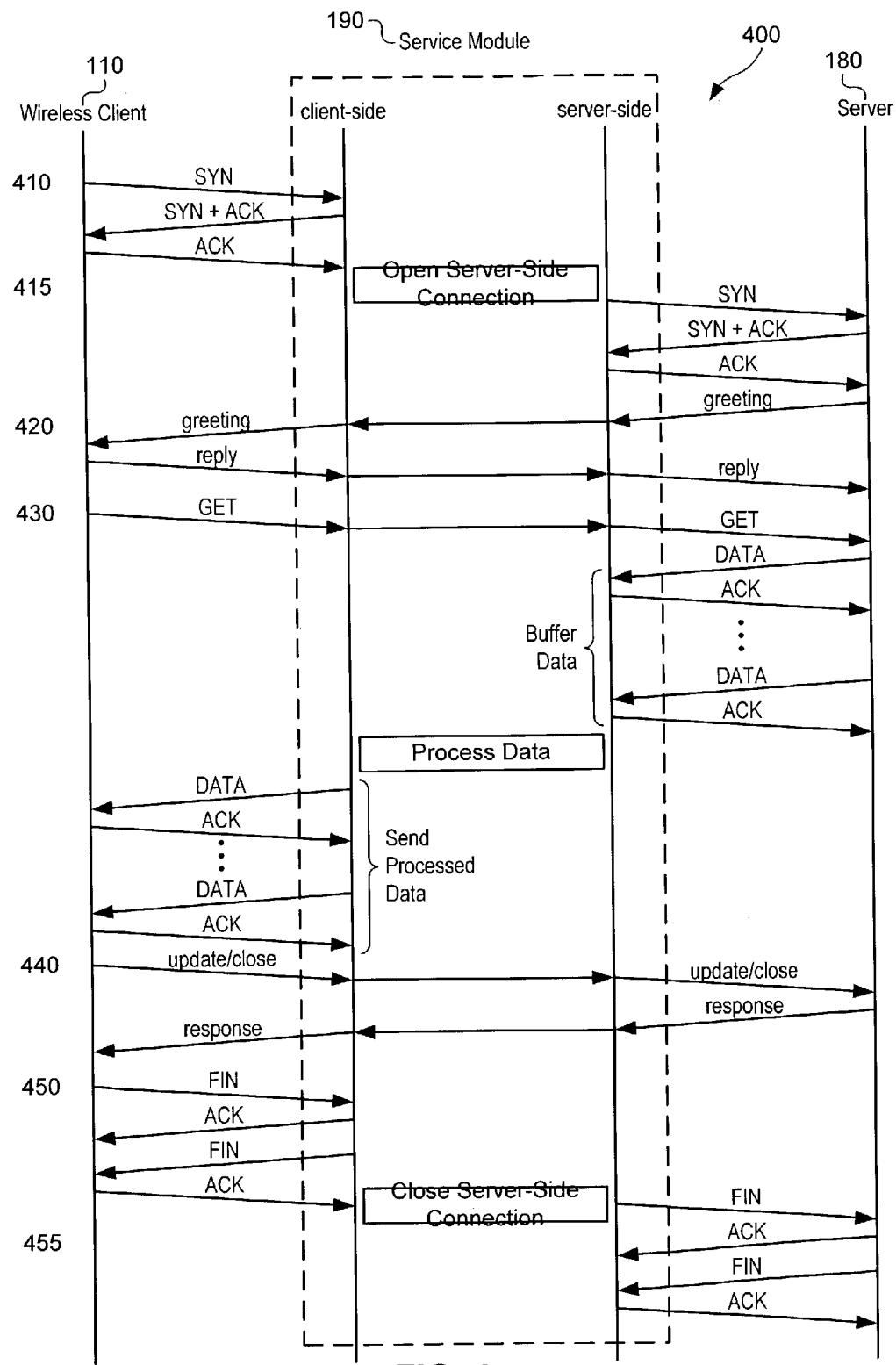
FIG. 4 illustrates a signal flow diagram showing exemplary signals passed between a wireless client, service module and server during an exemplary communication session.

Referring to FIG. 4, a signal flow diagram showing exemplary signals passed between a wireless client, service module and server during an exemplary communication session is illustrated generally at 400. As described above with respect to the embodiments of FIG. 3A and 3B, packets communicated between the wireless client 110 and the server 180 may be intercepted by the service module 190 and redirected to a service application. As a result, the service application may be configured to monitor data communicated between the wireless client 110 and the server 180 and to update the state of the communication session. The service application may then process received data in accordance with the current state of the communication session. For example, the wireless client 110 may initiate an communication session with the server 180 by attempting to engage in a three-way handshake with the server 180 as indicated generally at 410. During this connection establishment state, the service module 190 classifies the connection between the wireless client 110 and the server 180, and terminates the connection with the wireless client 110 at the service application in response to the connection establishment packet (e.g., SYN packet) matching a corresponding classification rule. The operating system and networking stack of the service module 190 then completes the three-way handshake with the wireless client 110. Once the client-side connection is accepted by the service application, the service application opens a separate server-side connection with the server 180 using the original destination address and destination port. The operating system and networking stack of the service module 190 similarly completes a three-way handshake with the server 415 as indicated generally at 415. This process breaks the end-to-end connection between the wireless client 110 and the server 180 to form a client side-connection between the wireless client 110 and the service module 190 and a server-side connection between the service module 190 and the server 180.

Once the service module 190 completes the connection establishment state with the wireless client 110 and the server 180, the communication session may then enter a user authentication or initial setup state as indicated generally at 420. The messages communicated between the wireless client 110 and the server 180 during this state vary depending on the particular application. For email applications, the server 180 may send a greeting packet to the wireless client 110 requesting an appropriate user name and password, and the wireless client 110 responds by sending the requested information to the server 180. For these user authentication messages, the service application maintains end-to-end semantics by forwarding messages between the client-side connection and the server-side connection. This process may involve reading the message from the client-side connection and writing the message to the server-side connection and vice versa. Because the service module 190 uses the original source and destination address and source and destination ports for outgoing packets, the wireless client 110 and server 180 respond as though they are communicating with one another.

Once the user authentication or initial setup state is complete, the communication session may then enter a transaction state as indicated generally at 430. During this state the wireless client 110 may request transmission of particular content, such as email messages or web page elements, as indicated generally by a GET command. The service application forwards this message to the server 180 by reading the message from the client-side connection and writing the message to the server-side connection. The service application then knows that the data received from the server 180 in response to the GET command will correspond to the requested data. The service application may then buffer the requested data received from the server 180. Furthermore, because the server-side connection is a separate connection, the operating system and networking stack of the service module 190 sends acknowledgement messages back to the server 180 in response to each received packet so that the server 180 will continue to send data corresponding to the requested data. Once the requested data has been received (as indicated, for example, by receipt of the specified number of bytes set forth in the initial data packet), the service application may then perform application-specific processing of the data, such as email compression, reformatting requested files, or reordering the sequence of received web page elements to optimize performance experienced by the user. The processed data may then sent to the wireless client 110 by writing the data to the client-side connection. Because the client-side connection is also a separate connection, the operating system and networking stack of the service module 190 suppresses acknowledgement packet received from the wireless client 110 and retransmits lost packets without notifying the server 180.

After the transaction state is complete, the communication session may then enter into an update state (as indicated generally at 440) that closes the communication session and a close state (as indicated generally at 450) that closes the connection between the wireless client 110 and the server 180. For messages communicated between the wireless client 110 and the server 180 during the update state, the service application maintains end-to-end semantics by forwarding messages between the client-side connection and the server-side connection. During the close state, however, the operating system and networking stack of the service module 190 responds to messages received by the wireless client 110 in order to close the client-side connection. The operating system and networking stack then notifies the service application that the client-side connection has been closed, and the service application responds by initiating closure of the server-side connection. The operating system and networking stack of the service module 190 then engages in conventional closure handshakes with the server 180 in order to close the server-side connection as indicated generally at 455.

Figure 5:
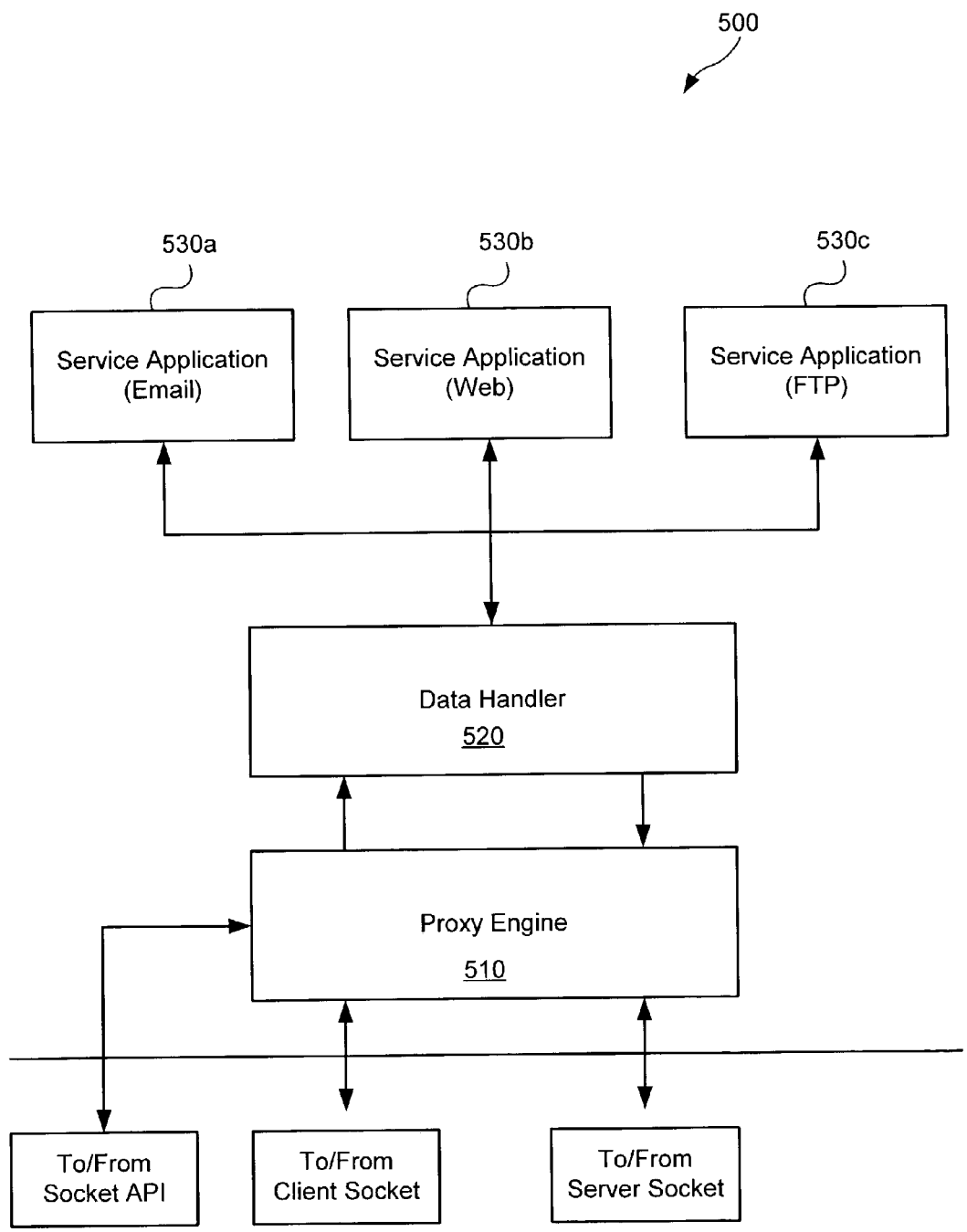
FIG. 5 illustrates a functional block diagram of an exemplary system for supporting multiple service applications in accordance with embodiments of the present invention.

Referring to FIG. 5, a functional block diagram of exemplary system for supporting multiple service applications in accordance with embodiments of the present invention is illustrated generally at 500. The exemplary system includes a proxy engine 510, a data handler 520, and a plurality of service applications 530. The proxy engine 510 acts as an interface between the data handler 520 and the operating system and networking stack and manages communication between the client socket and the server socket. During initial connection establishment stages, the proxy engine 510 interacts with the operating system and networking stack to break the connection between the wireless client and the server to form the client-side connection and the server-side connection. For example, the proxy engine 510 may monitor the available client sockets associated with each service application 530 and accept new connection requests received from the operating system and networking stack. The proxy engine 510 may then request the original packet header information associated with the client socket from the socket API and open the server socket using the original destination address and destination port. The proxy engine 510 also calls the socket API to either create a new entry in the classification table or modify the TCP control block to store the connection information associated with the server socket. Once the client socket and the server socket have been established, the proxy engine 510 listens to the client socket and server socket for incoming data. The proxy engine 510 then passes data received from the client socket and server socket to the data handler 520 and writes the data returned by the data handler 520 to the appropriate client socket or server socket.

Once the data handler 520 receives data from the proxy engine 510, the data handler 520 inspects the data to determine the corresponding service application 530 that processes data of that type. For example, the proxy engine 510 may pass the source port from which the data was received to enable the data handler 520 to determine the service application 530 to process the data. Because the service module may associate each source port with a corresponding service application (e.g., source port 4000 may correspond to email application 530*a*, source port 4001 may correspond web application 530*b*, and source port 4002 may correspond to FTP application 530*c*), the data handler 520 may then determine the particular service application 530 associated with the data. For example, if the source port associated with the data corresponds to an email service, the data handler 520 may then call the email service application 530*s* to process the incoming data. On the other hand, if the source port corresponds to web service, the data handler 520 forwards the incoming data to web service application 530*b*. A similar process may be performed in the event the source port corresponds to an FTP service in order to forward the data to the FTP service application 530*c*. As a result, the service module may be configured to support multiple service applications corresponding to different types of applications.

If the data handler 520 passes the data to the email service application 530a, the email service application 530s processes the data and performs the protocol-specific functions associated with managing the email session. For example, the email service application 530a may be configured to monitor the data received from the data handler 520 and maintain a state machine for the email session. Based on the state of the email session, the data may be either returned to the data handler 520 or buffered within the email service application 530a. For data corresponding to connection establishment, user authentication and other protocol-specific messages, the email service application 530s may update the state machine and pass the data back to the data handler 520, which forwards the data to the proxy engine 510. The proxy engine 510 then forwards the messages to the originally intended destination by writing the messages to the client socket or server socket. This transfer of data up to the email service application 530s enables the email service application 530a to monitor the state of the email session and detect initiation of an email message transaction. Conversely, the transfer of data down to the proxy engine 510 enables the proxy engine 510 to maintain the end-to-end semantics between the wireless client and the server. If the email service application 530a detects the initiation of an email message transaction (e.g. the data was received in response to a FETCH or RETR command), the email service application 530a buffers the email message data. Once the entire email message is received, the email service application 530a may then process the email message (e.g., by compressing the email message) and then return the processed email message to the data handler 520 to be forwarded to the originally intended destination.

Similar operations may be performed by the web service application 530b and the FTP service application 530c depending on the particular services performed by these applications. In other words, other service applications 530 that may be supported by the service module may be configured to monitor the state of the communication sessions and either forward application-specific messages to the originally intended destination (in order to maintain the end-to-end connection) or buffer and process the message for reinsertion into the data stream. Of course, the types of service applications that may be supported by the service module may perform additional or different services than the exemplary service applications described herein. One advantage of a service module configured in accordance with embodiments of the present invention includes the ability to provide a platform for supporting multiple service applications that selectively provide value-added services depending on the particular application and/or particular subscriber.

Figure 6:
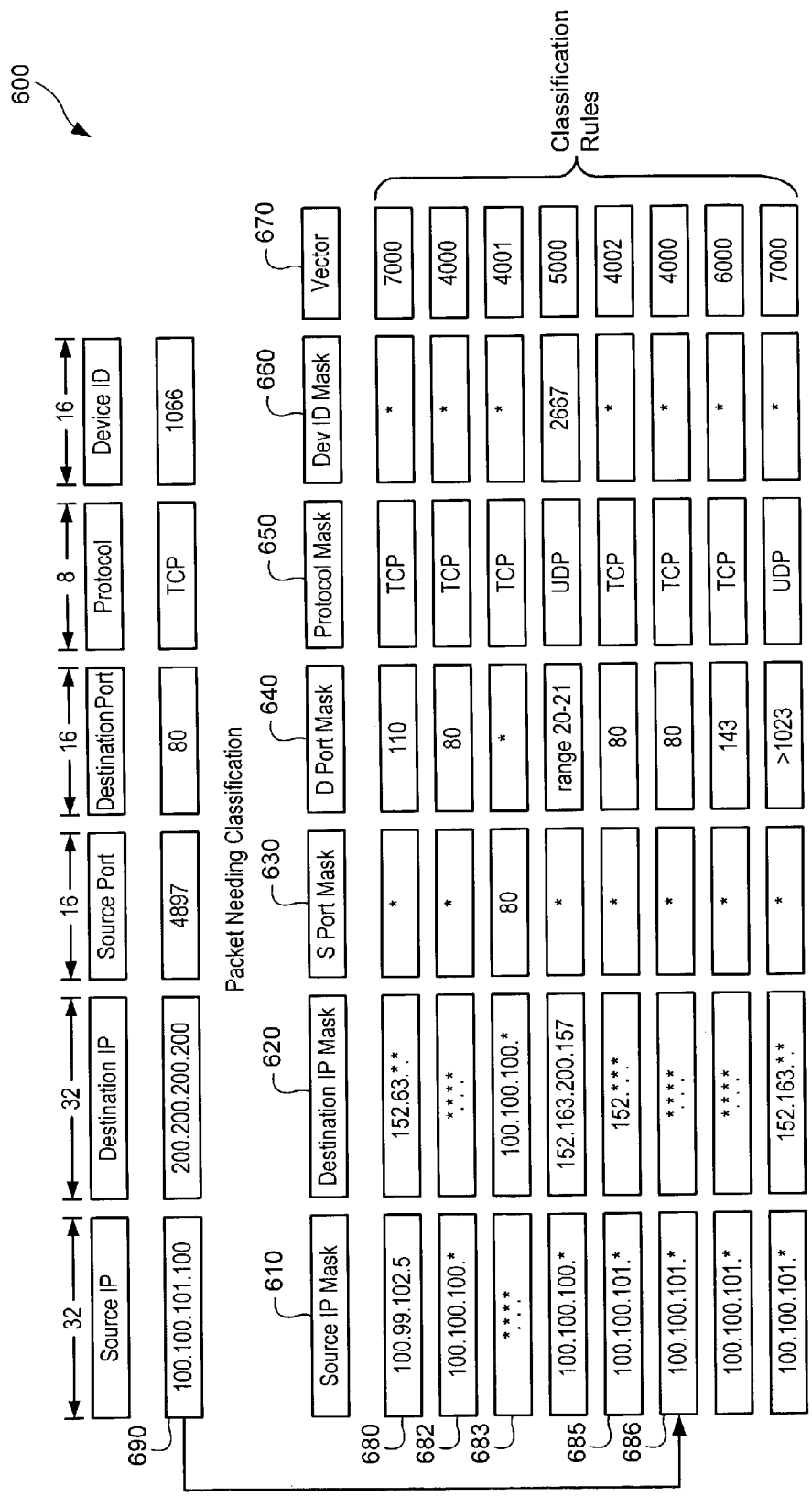
FIG. 6 illustrates exemplary classification rules that may be used in accordance with embodiments of the present invention.

Referring to FIG. 6, exemplary classification rules that may be used in accordance with embodiments of the present invention are illustrated generally at 600. As illustrated, the exemplary classification rules comprise a set of masks corresponding to each dimension of a TCP/IP packet header. These exemplary masks enable embodiments of the present invention to perform classification on the entire 6-tuple, thereby enabling the service module to perform differentiated services based the identity of the subscriber (based on the source or destination IP address), the type of source process (based on the source IP address and/or source port), the type of destination process (based on the destination IP address and/or destination port), the protocol field and the device ID or any combination of the foregoing. For example, the exemplary classification rules may comprise a source IP mask 610, a destination IP mask 620, a source port mask 630, a destination port mask 640 a protocol mask 650 and a device ID mask 660. The classification rules may also include a vector field 670 that identifies the destination address (which may be the local IP address of the service module) and the destination port associated with the service application that performs the application-specific services associated with the particular classification rule.

Each mask may be configured to specify an exact match for all bits of the packet header field, an exact match for some of the bits of the packet header field, or a "don't care" or wildcard for some or all bits of the packet header field. For classification rule 680, for example, source IP mask 610 indicates that all four bytes of the source IP address under examination must exactly match "100.99.102.5"; the destination IP mask 620 indicates that the first two bytes of the destination IP address must exactly match "152.63" and the remaining two bytes are don't cares; the source port mask 630 indicates that the source port field under examination may be any value; the destination port mask 640 indicates that the destination port field must exactly match "110"; the protocol mask 650 indicates that the protocol field must exactly match "TCP"; and the device ID mask 660 indicates that the device ID field may be any value. If a packet header under examination matches classification rule 680, then the vector field 670 indicates that the connection should be redirected to destination port "7000" (which may correspond to the port assignment associated with the service application for performing the particular service associated with the classification rule). Of course, the masks may specify other relationships in addition to exact match and wildcard. For example, the masks may specify a range of appropriate values or an inequality relationship, such as a greater than relationship.

In practice, the configuration of the masks may influence the manner in which the service application performs. For example, classification rule 682 may enable the service module to perform services, such as web acceleration, on the downlink channel toward the source by masking the source IP address and the destination port. Classification rule 683, on the other hand, may enable the service module to perform the same services on the uplink channel toward the destination by masking the destination IP address and source port. Furthermore, the classification rules may be configured such that multiple classification rules may match a given packet header. In order to maintain priority among the multiple classification rules, however, the classification rules may be ordered such that the higher priority (or more specific rule) is applied first. For example, classification rules 685 and 686 may potentially match the same packet header. However, because classification rule 685 would be applied first in the order list, classification rule 685 would prevail in the event of a conflict.

In order to perform classification of a packet header, such as packet header 690, the masks associated with the first classification rule in the ordered list may be applied to the corresponding fields of the packet header. If a match occurs, the classification procedure may return the vector field 670 indicating the destination address and destination port of the service application to which the connection should be redirected. If a match does not occur, the masks associated with the next classification rule may be applied to the packet header to determine whether there is a match. This process continues until the packet header either matches a classification rule or the list of classification rules is exhausted. If the packet header does not match any classification rule, then the service module may perform no services or redirect the packet to an agreed to default service application.

Although this process of iteratively applying the classification rules may be time consuming, it may provide a simple solution for a relatively small set of classification rules.

In order to provide a more efficient solution for a relatively large set of classification rules, embodiments of the present invention may divide the classification rules among a plurality of hashing tables based on a portion of each classification rule that is not wildcarded. This process enables the hashing tables to store classification rules based on a particular packet dimension or combination of packet dimensions. The hashing tables may then be searched by dividing the packet header into plurality of hash fields based on the packet dimensions used by the hashing tables. For example, if a hashing table stores classification rules based on the source IP address, the hash fields may include a first hash field comprising the 16 most significant bits of the source IP address and a second hash field comprising the 16 least significant bits of the source IP address. The classifier may then employ a multi-stage hashing approach that searches a first hashing table based on a first hash field and then resolves any hash conflicts (e.g. classification rules that hash to the same entry in the hashing table) using a second hash field. If a match between a classification rule and the packet header under examination does not occur using the first hashing table, a second hashing table may be searched based on a third hash field and any hash conflicts may be resolved using a fourth hash field. The hashing tables may be searched in order based on successive hash fields until a match is found, the search returns an unoccupied hash entry (indicating that a classification rule does not exist for the particular packet header), or a threshold number of iterations of the classification algorithm have been performed. By dividing the classification rules among a plurality of hashing tables and employing a multi-stage hashing approach, the search time for classification rules may be significantly decreased by storing classification rules having severe hash conflicts in one packet dimension within a hashing table associated with another packet dimension where fewer hash conflicts exist.

Although the plurality of hashing tables may be searched in order using successive hash fields, other embodiments of the present invention may further increase classification efficiency by incorporating one or more flags within entries of the hashing tables that selectively redirect the classifier to another hashing table or hash field where fewer hash conflicts exist. For example, if a hashing table associated with the source IP address has significant hash conflicts associated with a particular source IP address (or portion of the source IP address), the flags may direct the classifier to another hashing table associated with another packet dimension, such as the destination port, source port or protocol, where fewer hash conflicts exists. The flags may also be used to cause the classifier to resolve hash conflicts within a single hashing table using different hash fields. For example, the flags may be used to cause the classifier to resolve hash conflicts associated with one entry in a hashing table using a first hash field, such as the 16 least significant bits of the source IP address, and to resolve hash conflicts associated with another entry in the same hashing table using a different hash field, such as the destination port. These aspects of the present invention exploit the fact that while a significant number of classification rules may have severe hash conflicts in a few dimensions, they may be readily resolvable using one "right" dimension. By providing useful hints within the hash entries that guide the classifier regarding which hashing table and/or hash field to use, the classifier may be able to resolve hash conflicts with increased efficiency.

The efficiency in resolving hash conflicts may be further increased by arranging the hash conflicts within a fat and short B+ (or m-ary) tree structure. For example, embodiments of the present invention may store hash conflicts within a hash entry as a set of sorted keys and pointers. The sorted keys enable the classifier to perform a binary search of the keys based on the current hash field to find the key that is less than or equal to the current hash field. Based on the selected key, the classifier may then access the memory location indicated by the pointer to the right of the selected key (or to the left of the selected key if all keys are greater than or equal to the hash field). If the indicated memory location comprises a classification rule (e.g., the memory location comprises a leaf node), the classifier applies the rule to the packet header. If the indicated memory location comprises another set of keys and pointers (e.g., the memory location comprises an intermediate node), the classifier again performs a binary search of the sorted keys and pointers to determine the next memory location to access. This process of performing an m-ary search of hash conflicts may significantly increase classification efficiency by exploiting the width of memory cache lines (which may comprise between 32 bytes and 64 bytes depending on the particular architecture) to store multiple hash conflicts (keys and pointer) on a single cache line. For an architecture utilizing a 64 byte cache line, for example, these embodiments of the present invention may store 16 pointers and 15 keys, each 16 bits in size, within a single cache line. By arranging the m-ary tree structure in "fat" nodes with a significant number of keys and pointers, the implementation efficiency may be increased by reducing the number of required memory accesses to resolve hash conflicts. The m-ary tree may also be configured to be relatively "short" with a fewer number intermediate levels by either incorporating a large number of keys within a single cache line or selectively redirecting the classifier to another hashing table where fewer conflicts exist.

Other embodiments of the present invention may increase classification efficiency, while also reducing memory utilization. In these embodiments, the hashing tables may incorporate one or more flags for indicating the next memory pool. The next memory pool flag may be used to indicate a portion of memory where the next hashing table is stored or where additional leaf or intermediate nodes associated with m-ary tree structures are stored. For example, if the m-ary tree structures associated with one or more hashing tables cannot be stored within unused portions of the respective hashing tables, the next memory pool flag may be used to indicate the memory pool associated with the pointers of the m-ary tree. In other words, the pointers associated with the m-ary tree structure may be used to specify an offset within the memory pool associated with the next memory pool flag, thereby enabling hash conflicts associated with multiple hashing tables to be stored in a single memory pool. Of course, the next memory pool flag may point to the current hashing table so that hash conflicts (pointers and keys) are stored within unused entries of the same hashing table.

The next memory pool flag may also be used in combination with the next hash field flag to enable the classifier to hash a single hashing table using different hash fields. For example, the classifier may initially hash a hashing table using a default hash field associated with the hashing table, such as the 16 most significant bits of the source IP address. If the packet header under examination does not match the classification rule stored in the hash entry, or if a binary search of the hash conflicts indicates a null pointer, the classifier may then examine the next hash field flag and next memory pool flag. If the next memory pool flag corresponds to the current hashing table, the classifier may then hash the current hashing table using the next hash field (which may be different than the hash field used to initially hash the hashing table). As a result, this aspect of the present invention enables a single hashing table to be hashed using multiple packet dimensions (or hash fields) and may be especially advantageous in the event of a sparse set of classification rules.

Figure 7:
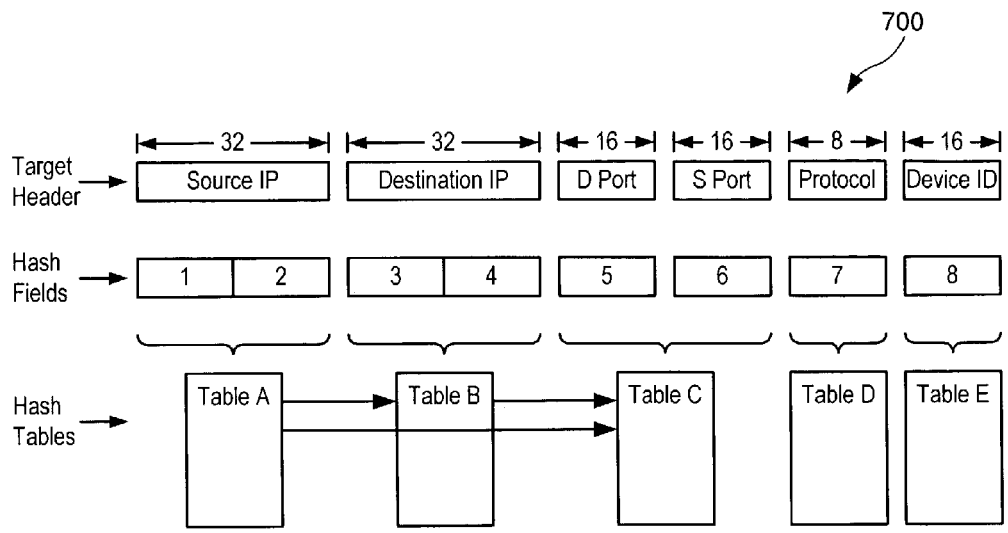
FIGS. 7 illustrates an exemplary arrangement of hashing tables and hash fields in accordance with one embodiment of the present invention.

Referring to FIG. 7, an exemplary arrangement of hashing tables and hash fields in accordance with one embodiment of the present invention is illustrated generally at 700. As illustrated, the packet header undergoing classification may be divided into a plurality of hash fields based on the fields of the packet header. One embodiment of the present invention may divide the packet header into eight hash fields, each comprising 16 bits (with the exception of the hash field 7, which comprises 8 bits). For example, hashing field 1 may comprise the 16 most significant bits of the source IP address, and hashing field 2 may comprise the 16 least significant bits of the source IP address. Similarly, hashing field 3 may comprise the 16 most significant bits of the destination IP address, and hashing field 4 may comprise the 16 least significant bits of the destination IP address. The remaining hashing fields (labeled 5–8) each include the bits corresponding to respective packet header fields.

The embodiment of FIG. 7 may also include a plurality of hashing tables that store classification rules based on a single packet dimension or combination of packet dimensions. In other words, the classification rules may be divided among the plurality of hashing tables based on one or more portions of the classification rule that are not wildcarded. For example, hashing table A may store classification rules that are hashed based on a the source IP address; hashing table B may store classification rules that are hashed based on the destination IP address; hashing table C may store classification rules that are hashed based on the destination port and source port; hashing table D may store classification rules that are hashed based on the protocol field; and hashing table F may store classification rules that are hashed based on the device ID. Each hashing table may then be associated with one or more hash fields that are used to hash the corresponding hashing table and resolve any hash conflicts. For Table A, for example, hash field 1 may be used to initially hash to a hash entry in Table A and hash field 2 may be used to resolve any hash conflicts (e.g., by comparing hash field 2 of the packet header in accordance with a set of sorted keys and pointers in the event the hash conflicts are stored in an m-ary tree structure).

The plurality of hashing tables may be searched using a multi-stage hashing approach to determine whether a packet header undergoing classification matches an existing classification rule. The hashing tables may be searched in accordance with succeeding hash fields until a match is found or the classification fails due to a lack of a classification rule. For example, Table A may be hashed using hashing field 1 and any conflicts may be resolved using hashing field 2. If a match is not found and the classification has not failed, then Table B may be hashed using hashing field 3 and any conflicts may be resolved using hashing field 4. This process may continue for successive hashing tables and successive hash fields until a match is found or the classification fails. In an alternative embodiment, the hash entries may include a flag that indicates the next hashing table to search. For example, a particular set of classification rules may have significant hash conflicts based on the source IP address and destination IP address. Accordingly, searching Table A followed by Table B may not result in efficient classification. Incorporating a flag within a hash entry having significant hash conflicts that indicates the next hashing table to search, however, may enable the classifier to bypass a hashing table were further significant conflicts exist and search a hashing table having fewer hash conflicts. As illustrated in FIG. 7, for example, the next hashing table flag associated with a hash entry in Table A may notify the classifier to skip Table B and proceed with multi-stage hashing using Table C. Furthermore, as noted above, the flag may also cause the classifier to resolve hash conflicts using a hash field other than the next succeeding hash field. For example, the classifier may be configured to initially hash Table A using field 1, and the flag may cause hash conflicts in Table A to be resolved using field 3.

Figure 8:
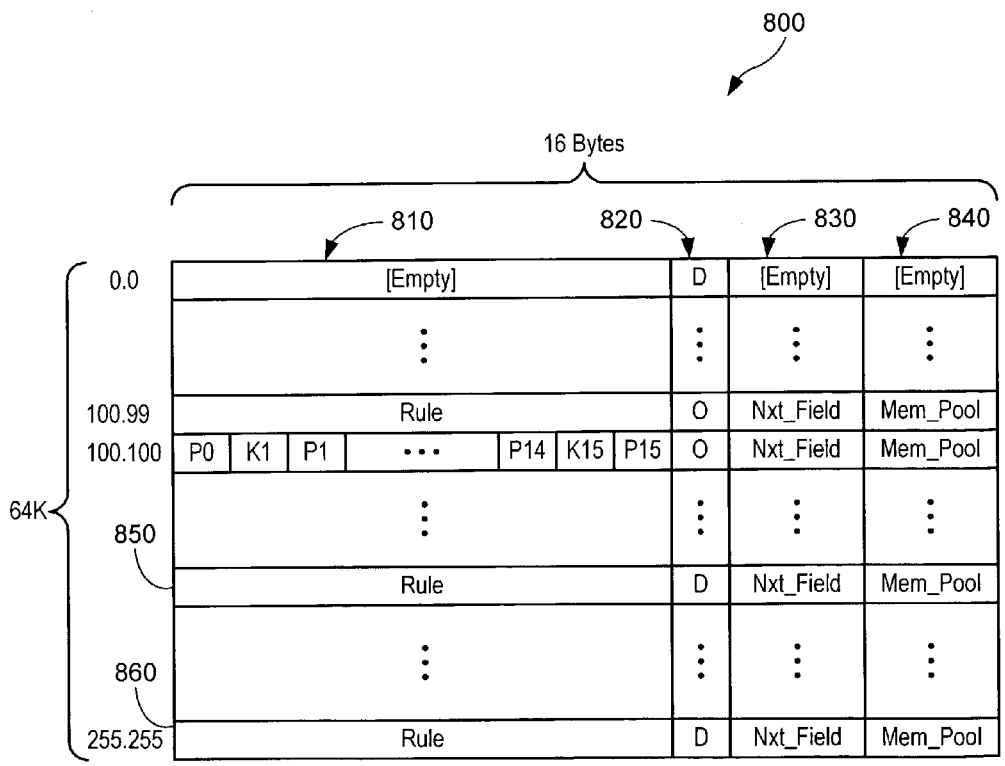
FIG. 8 illustrates exemplary fields of an exemplary hashing table in accordance with one embodiment of the present invention.

Referring to FIG. 8, exemplary fields of an exemplary hashing table in accordance with one embodiment of the present invention is illustrated generally at 800. As illustrated, the exemplary hashing table may include four fields: a rule field 810, an default/occupied flag 820, a next field flag 830, and a next memory pool flag 840. The rule field 810 includes either a classification rule or a set of sorted keys and pointers arranged in an m-ary tree structure. The default/occupied flag 820 indicates whether a particular entry in the hashing table is "occupied" by a classification rule (or set of pointers and keys) or corresponds to unused or "default" hash entry (that may be currently storing information associated with another hash entry). The default/occupied flag 820 basically enables unused hash entries to be used to store classification rules associated with the leaf nodes of the m-ary tree or additional sets of pointers and keys, thereby increasing the efficiency of memory management for a sparse set of classification rules. During classification, the classifier may examine the occupied/default flag 820 to determine whether to apply the hash entry to the packet header.

As discussed above, the next field flag 830 may be used for a number of purposes during classification of packet headers. In one embodiment, the next hash field 830 may be used to indicate the portion of the packet header to use to resolve hash conflicts. This embodiment basically enables the classifier to change the context of the keys and pointers and to switch to a different hash field during a search of the m-ary tree structure. For example, the next hash field 830 may comprise a 3-bit field that enables to classifier to switch to any one of eight hash fields for purposes of performing a binary search of the keys. In other words, the next hash field 830 (which may be different for different for different hash entries) may be used to indicate that the keys correspond to a destination port, source port or any other hash field.

The next memory pool field 840 may comprise a 4-bit field that specifies one of sixteen memory pools. These memory pools may correspond to hashing tables or additional portions of memory for storing nodes of m-ary tree structures. For example, the next memory pool field 840 may cause the classifier to switch to a different hashing table in the event a packet header does not match a classification rule stored at a particular hash entry or a pointer in an m-ary tree structure comprises a null pointer. In this context, the next memory pool field 840 may be used in conjunction with the next hash field 830 to specify the hashing table and the hash field to be used for hashing. The next memory pool field 840 may also be used to specify the memory pool indicated by the pointers in the m-ary tree structure. In other words, the next memory pool field 840 may be used in conjunction with the pointers to specify one of a plurality of memory pools where the data associated with the pointer is stored, which may be the same as or different than the memory pool for the current hashing table.

As further illustrated in FIG. 8, the exemplary hashing table may comprise 64K cache lines, with each line comprising 64 bytes, for a total of 4 megabytes. Because the hash fields may comprise 16-bit portions of the packet header, the hashing function may comprise a simple offset into the hashing table (although other, more complicated hashing functions are possible). The width of each cache line may be exploited to store multiple hash conflicts as an m-ary tree structure within a single cache line. For example, with a cache line width of 64 bytes, each cache line may store 15 keys and 16 pointers, each having 16 bits. The 16 bit pointers may be used to point to an additional (unused) cache line within the hashing table that stores leaf nodes or additional nodes of keys and pointers. For example, pointer P0 illustrated in FIG. 8 may point to cache line 850 and pointer P2 may point to cache line 860. Alternatively, the pointers may be used in combination with the next memory pool field 850 to point to another portion of memory. Because multiple keys and pointer may be stored within a single cache line, the classifier may be able to resolve hash conflicts with increased efficiency.

In operation, embodiments of the present invention may employ the following algorithm in order to classify an incoming packet:

cessors can use the hashing tables in shared memory without the overhead of mutual exclusion with updates or simultaneous classification requests. A form of mutual exclusion (multireader lock) is used to sequentialize updates to the hashing table. When an update request is reading cache lines comprising the m-ary tree structure for hash conflicts, it acquires the lock in read mode for the tree. Multiple requests can acquire read mode, but all of the requests must be relinquished before write mode can be acquired. In other words, only one requestor may acquire write mode at a time in order to maintain data integrity. Writes that update a cache line do not acquire write mode, but writes that require splitting a cache line into two portions do. These updates produce two versions of the portion of the tree that they modify. The old version persists in memory while there may be classification requests in progress. The memory for the old version is reclaimed once the update request ensures that all classification requests that were in progress have been completed. One mechanism for reclaiming memory is creating artificial classification requests that increment a counter (or clear a set flag) for each classification processor in the system. Once all of the counters have been incremented or flags cleared, each classification processor has had to have completed any classification requests that had stale references to the old version as well as a portion of the artificial classification requests.

Figure 9A:
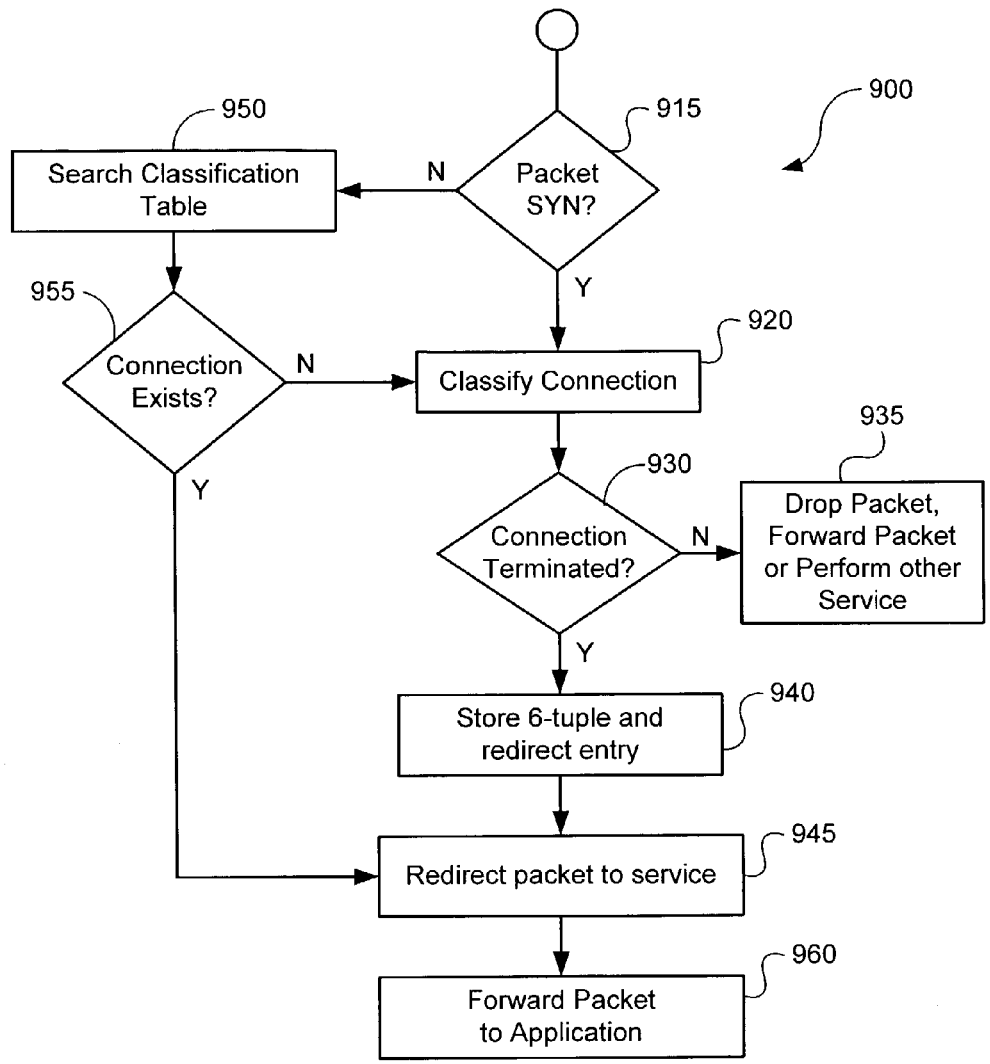
FIGS. 9A and 9B illustrate exemplary methods in flowchart form for redirecting received packets and reinserting packets into a data stream, respectively.

Referring to FIG. 9A, an exemplary method in flow chart form for classifying and redirecting received packets in accordance with one embodiment of the present invention is

```
Classify(Packet)
{
    HashEntry = Table A [Source IP Address];
Restart:
    If HashEntry is a Rule and it matches the packet, return the Rule.
    If HashEntry is a Rule and it does not match the packet, search the
Table specified in the Memory Pool flag using the hash field specified by the Nxt_Field
flag.
    Otherwise HashEntry is a vector of keys and pointers.
    Using a binary search, find the key that is less than or equal to the
hash field specified by the Nxt_Field flag.
    Goto Restart: with HashEntry equal to the HashEntry pointed to by
the pointer to the right of the selected key. (Or the first pointer, if all of the keys are
greater than the hash field.)
}
```

If a packet header does not match a classification rule or a pointer indicated by the binary search comprises a null pointer, the classification algorithm may examine the next field flag 830 and next memory pool flag 840 to determine whether to continue searching the current hashing table using the current hash field or to continue classifying the packet header by hashing a different hashing table based on the hash field indicated by the next hash field flag 830. As discussed above, this aspect of the present invention may enable the classifier to bypass hashing tables that have severe hash conflicts, thereby resulting in more efficient classification.

In the event multiple classification processors are employed to classify multiple packet headers in parallel, embodiments of the present invention may maintain hashing tables in an incrementally correct state when new rules are added or removed. This aspect of the present invention enables classification to continue, without employing a mechanism for dropping or delaying packets while updating the hashing table. As a result, multiple classification proillustrated generally at 900. Once the exemplary method is initiated in response to an incoming packet, the exemplary method determines at step 915 whether the packet corresponds to a connection request packet, such as a SYN packet, indicating that the packet corresponds to a new connection that has not been previously classified. If the packet corresponds to a connection request packet, the exemplary method proceeds to step 920, where the packet is classified in accordance with one or more classification rules to determine whether the packet corresponds to one of the plurality of service application that may be supported by the service module. The classification rules may comprise one or more masks that are applied to the packet header. If the packet does not match a classification rule, the method does not terminate the packet at the service module, and either drops the packet, forwards the packet to the operating system and networking stack without modification, or performs a default service on the packet. If the packet matches a classification rule, the method stores the original packet header information and redirected destination address and destination port with a connection table or within a TCP control block at step 940, and redirects the packet to the service application associated with the classification rule at step 945. The operating system and network stack of the service module then forwards the packet data to the service application at step 960.

Referring back to step 915, if the incoming packet does not correspond to a connection request packet and the service module employs the classifier below the TCP layer (as in the embodiment of FIG. 3A), the method may search the connection table at step 950 to determine whether the packet corresponds to an on-going connection. This process may involve searching the connection table to determine whether the packet header of the incoming packet corresponds to an entry stored in the connection table. If so, the method proceeds to step 945 where the packet header is modified to replace the original destination address and destination port with the redirected destination address and destination port associated with the entry stored in the connection table. The modified packet is then forwarded through the operating system and networking stack of the service module to the service application at step 960. If the packet header of the incoming packet does not match an entry stored in the connection table at step 955, the method proceeds to step 920 to classify the packet in accordance with the above-described process.

Figure 9B:
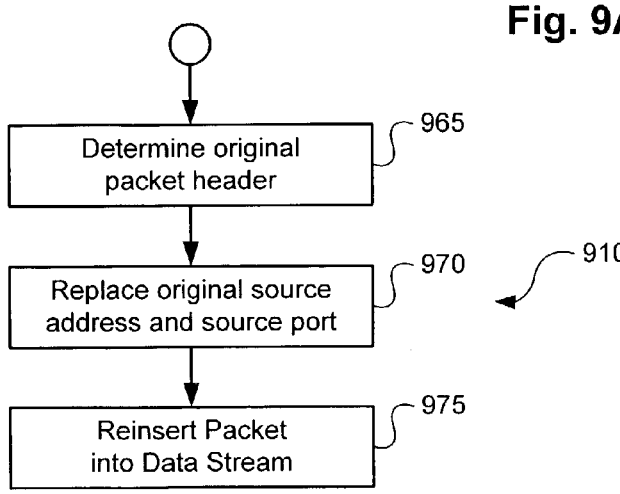

Referring to FIG. 9B, an exemplary method in flow chart form for reinserting packets into a data stream is illustrated generally at 910. Once the exemplary method is initiated in response to outgoing packets flowing through the operating system and network stack of the service module, the method determines the original packet header information associated with the end-to-end connection at step 965. In one embodiment, this process may involve searching a connection table based on the packet header of the outgoing packet to determine the original source address associated with the end-to-end connection, and replacing the source address and source port of the outgoing packet with the original source address and source port at step 970. For example, for outgoing packets addressed to the server, the method may replace the source address and source port of the outgoing packet with the source address and source port associated with the wireless client. Conversely, for outgoing packets addressed to the client, the method would replace the source address and source port of the outgoing packet with the source address and source port associated with the server. Once the outgoing packet has been modified, the method then reinserts the modified outgoing packet into the data stream at step 975. The outgoing packet may then be routed through the communications network to the originally intended destination.

In an alternative embodiment of the present invention, the method may determine the original source address and source port at step 965 by examining TCP control block parameters that were stored during an initial classification step. The operating system and networking stack may then use this information at step 970 to automatically generate outgoing packets having a source address and source port associated with the end-to-end connection by, for example, generating packets addressed to the server using the source address and source port associated with the wireless client or generating packets addressed to the wireless client using the source address and source port associated with the server. Because the original source address and source ports are incorporated within the packet header, the destination will treat the packet as though the originated from the source. The foregoing process may be performed on all outgoing packets communicated to the source and destination so that the source and destination are unaware that the packets were processed by the server module.

Figure 10:
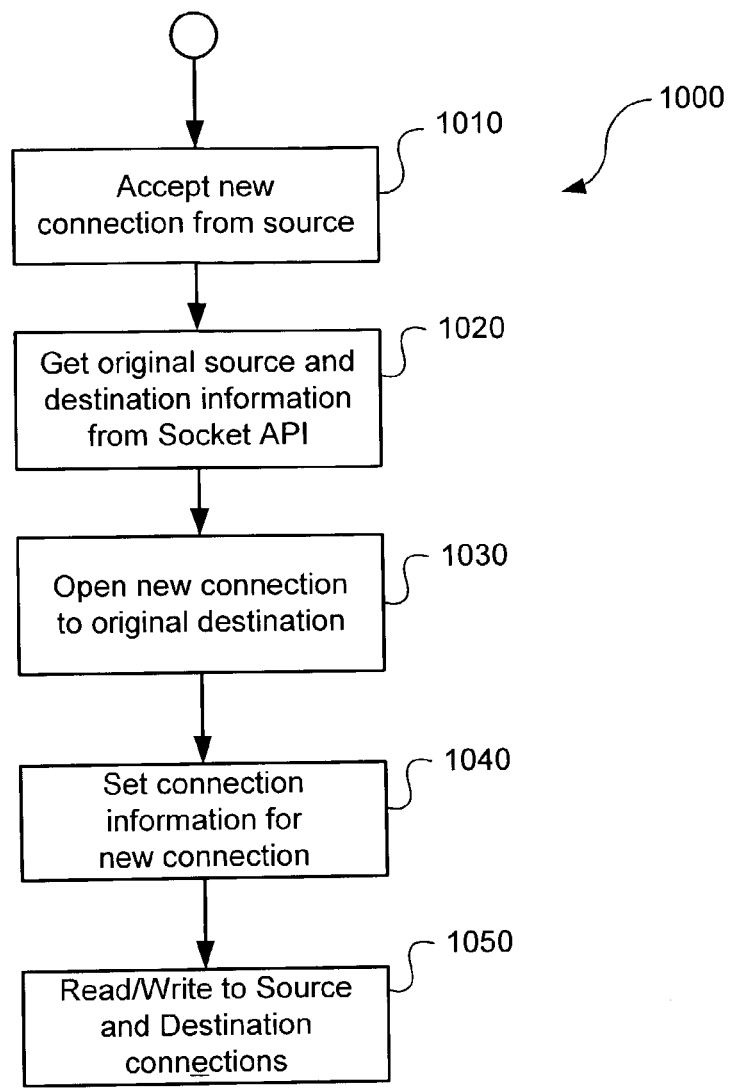
FIG. 10 illustrates an exemplary method in flowchart form for establishing a client-side connection and a server-side connection.

Referring to FIG. 10, an exemplary method in flowchart form for establishing a client-side connection and a server-side connection is illustrated generally at 1000. The exemplary method of FIG. 10 may be performed by an service application in order to break a connection between the wireless client and the server by terminating the connection with the wireless client at the service application and opening a new connection between the service application and the server. The exemplary method may be initiated in response the operating system and networking stack setting a flag informing the service application that a new connection has been requested. At step 1010, the method may accept the connection from the source (typically the wireless client) to form a client-side connection between the service application and the source. The method then retrieves the original packet header information at step 1020 by calling an associated socket API to enable the service application to open a new connection to the original destination address and destination port at step 1030 to form a server-side connection between the service application and the original destination. Furthermore, in order to enable the service module to redirect incoming packets to the service application on the server-side connection and replace the original source address and source port for outgoing packets, the method also calls the socket API at step 1040 to set the connection information associated with the server-side connection. The service application may then read messages from and write messages to the client-side and server-side connections at step 1050.

Figure 11:
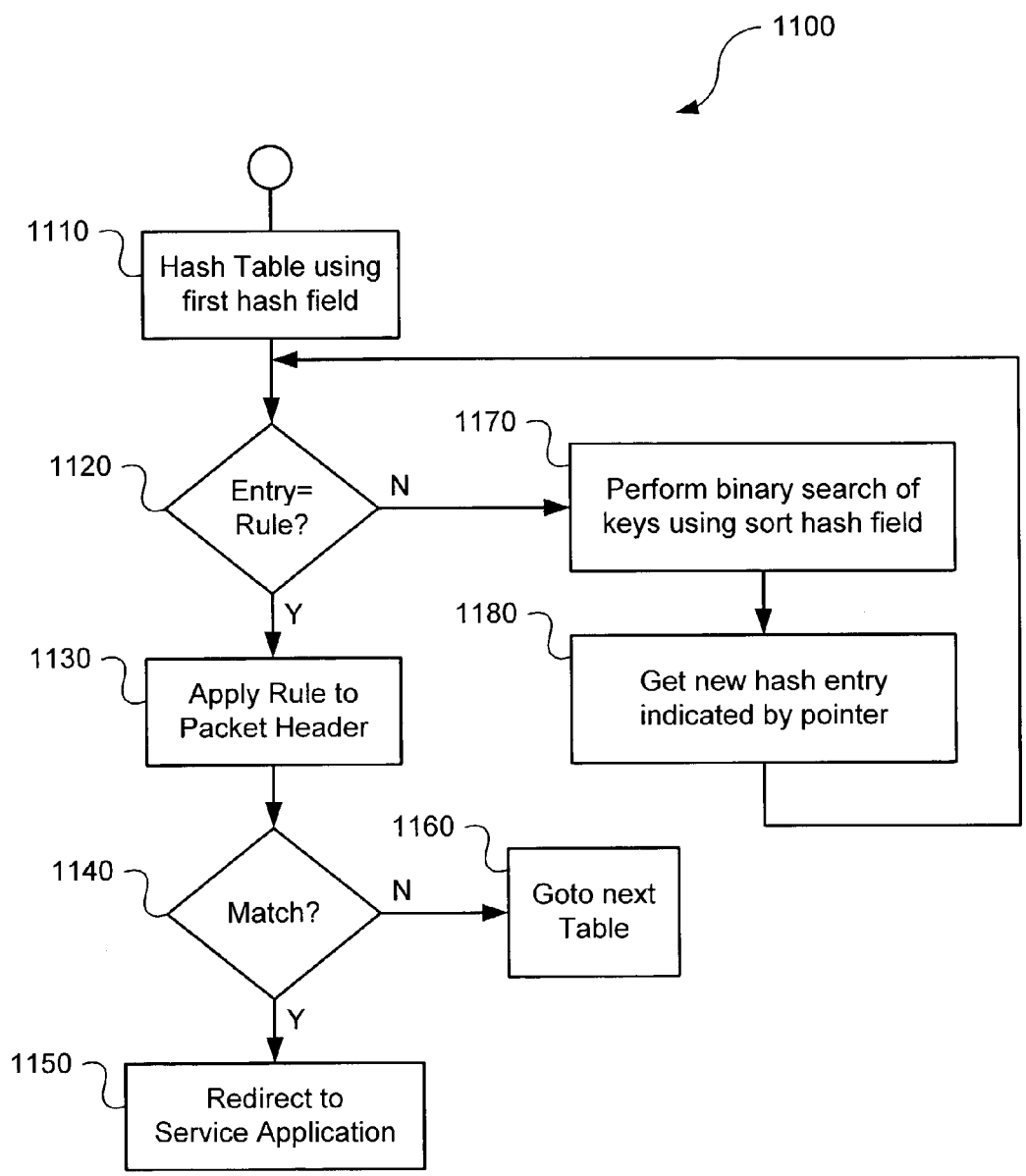
FIG. 11 illustrates an exemplary method in flowchart form for classifying a received packet in accordance with one embodiment of the present invention.

Referring to FIG. 11, an exemplary method in flowchart form for classifying a received packet in accordance with one embodiment of the present invention is illustrated generally at 1100. The exemplary method may be initiated in response to a received packet. Once the exemplary method is initiated, the first hashing table is hashed at step 1110 using the first hash field, such as the 16 most significant bits of the source IP address of the packet undergoing classification. If the hash entry indicated by the first hash field comprises a classification rule at step 1120, the classification rule is applied to the packet header at step 1130. If a match occurs at step 1140, the packet is redirected to the service application associated with the classification rule at step 1150. Otherwise, the next field flag and next memory pool flag associated with the classification rule is examined, and the classification proceeds using the specified hashing table and hash field.

Referring back to step 1120, if the hash entry does not comprise a rule and the hash entry is not empty, then hash entry comprises a set of keys and pointers. The method then proceeds to step 1170 where a binary search is performed on the keys and pointers using the hash sort field indicated by the next hash field flag to determine the next hash entry to access. At step 1180, the hash entry indicated by the pointer to the right of the key that is less than or equal to the hash sort field is retrieved, and the method returns to step 1120 so that classification process may be performed on the new hash entry.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for performing services within a network communication system, the method comprising:
   providing a plurality of service applications at a service module, the service module disposed between a client and a server;
   intercepting at least one packet between the client and the server;
   determining whether the at least one packet matches a predetermined service criteria associated with at least one of the plurality of service applications;
   establishing a first connection between the service module and the client and a second connection between the service module and the server;
   terminating a connection between the client and the server at the service module to form the first connection;
   opening a separate connection between the service module and the server to form the second connection;
   receiving data transmitted by the server for the client;
   processing at least a portion of the data communicated between the client and the server using the service application associated with the predetermined service criteria; and
   transmitting the processed data to the client.

2. The method of claim 1, wherein the service module is arranged in an inline configuration within the network communication system, and wherein the step of intercepting comprises routing the at least one packet through the service module.

3. The method of claim 1, wherein the service module is arranged in an offload configuration, and wherein the step of intercepting comprises directing the at least one packet to the service module.

4. The method of claim 1, wherein the step of determining comprising classifying the at least one packet in accordance with a plurality of classification rules.

5. The method of claim 4, wherein the classification rules comprise one or more masks, and wherein the step of classifying comprises applying the one or more masks to a packet header of the at least one packet.

6. The method of claim 1, wherein the step of opening is performed by the service application associated with the predetermined service criteria.

7. The method of claim 1, wherein the step of establishing comprises redirecting packets communicated between the client and the server to the service application by replacing a destination address and destination port field of the at least one packet with a destination address and destination port associated with the service application.

8. The method of claim 1, wherein the step of establishing comprises generating control block parameters for the first connection and for the second connection.

9. The method of claim 1, further comprising identifying initiation of an application-specific transaction.

10. The method of claim 9, further comprising buffering data associated with the application-specific transaction prior to performing the step of processing.

11. The method of claim 1, wherein the step of transmitting comprises generating outgoing packets having a source address and source port associated with the server.

12. The method of claim 11, wherein the step of generating comprises replacing a source address and source port field of the outgoing packets with a source address and source port associated with the server.

13. The method of claim 11, wherein the step of generating comprises generating outgoing packets in accordance with control block parameters associated with the first connection, the control block parameters including a source address and source port associated with the server.

14. The method of claim 1, wherein the step of processing comprises compressing at least a portion of the data communicated between the client and the server.

15. A method for selectively performing at least one of a plurality of service applications within a network communication system, the method comprising:
   classifying a connection that has been requested between the client and the server to determine whether the connection matches a predetermined service criteria, the predetermined service criteria associated with at least one of the plurality of service applications;
   forming a first connection between the client and the service module and a second connection between the service module and the server in response to the connection matching the predetermined service criteria;
   terminating a connection between the client and the server at the service module to form the first connection;
   opening a separate connection between the service module and the server to form the second connection;
   using the first connection and the second connection to redirect at least a portion of data communicated between the client and the server to the service application associated with the predetermined service criteria.

16. The method of claim 15, wherein the step of classifying comprises classifying packets associated with the connection in accordance with a plurality of classification rules.

17. The method of claim 16, wherein the classification rules comprise one or more masks, and wherein the step of classifying further comprises applying the one or more masks to a packet header of the packets.

18. The method of claim 15, wherein the step of opening is performed by the service application associated with the predetermined service criteria.

19. The method of claim 15, wherein the step of using comprises replacing a destination address and destination port field of packets associated with the connection with a destination address and destination port associated with the service application.

20. The method of claim 15, wherein the step of using comprises generating control block parameters for the first connection and for the second connection.

21. The method of claim 15, further comprising identifying initiation of an application-specific transaction.

22. The method of claim 21, further comprising buffering data associated with the application-specific.

23. The method of claim 15, further comprising transmitting outgoing packets having a source address and source port associated with the end-to-end connection between the client and the server.

24. The method of claim 23, wherein the step of transmitting comprises replacing a source address and source port field of the outgoing packets with a source address and source port associated with the server.

25. The method of claim 23, wherein the step of transmitting comprises generating outgoing packets in accordance with control block parameters associated with the first connection, the control block parameters including a source address and source port associated with the server.

26. A system for performing differentiated services within a network communication system, the system comprising:
a processor; and
a memory unit, operably coupled to the processor, for storing data an instructions which when executed by the processor cause the processor to operate so as to:
provide a plurality of service applications at a service module, the service module disposed between a client and a server;
terminating a connection between the client and the server at the service module to form the first connection;
opening a separate connection between the service module and the server to form the second connection;
intercept at least one packet between the client and the server;
determine whether the at least one packet matches a predetermined service criteria associated with at least one of the plurality of service applications;
establish a first connection between the service module and the client and a second connection between the service module and the server;
receive data transmitted by the server for the client;
process at least a portion of the data communicated between the client and the server using the service application associated with the predetermined service criteria; and
transmit the processed data to the client.

27. A system for performing differentiated services within a network communication system, the system comprising:
a processor; and
a memory unit, operably coupled to the processor, for storing data an instructions which when executed by the processor cause the processor to operate so as to:
classify a connection that has been requested between the client and the server to determine whether the connection matches a predetermined service criteria, the predetermined service criteria associated with at least one of the plurality of service applications;
form a first connection between the client and the service module and a second connection between the service module and the server in response to the connection matching the predetermined service criteria; and
use the first connection and the second connection to redirect at least a portion of data communicated between the client and the server to the service application associated with the predetermined service criteria.

* * * * *